(12) United States Patent
DeLano et al.

(10) Patent No.: US 10,582,590 B1
(45) Date of Patent: Mar. 3, 2020

(54) MULTI-ELEMENT LIGHTING APPARATUS AND A METHOD OF IMPLEMENTING A MULTI-ELEMENT LIGHTING APPARATUS

(71) Applicants: Stephen DeLano, Milton, MA (US); John Joseph King, Wheaton, IL (US)

(72) Inventors: Stephen DeLano, Milton, MA (US); John Joseph King, Wheaton, IL (US)

(73) Assignee: Smart Power Partners LLC, Wheaton, IL (US)

( * ) Notice: Subject to any disclaimer, the term of this patent is extended or adjusted under 35 U.S.C. 154(b) by 0 days.

(21) Appl. No.: 15/645,658

(22) Filed: Jul. 10, 2017

Related U.S. Application Data

(60) Provisional application No. 62/427,037, filed on Nov. 28, 2016.

(51) Int. Cl.
  *H05B 37/02* (2006.01)
  *G01S 19/13* (2010.01)

(52) U.S. Cl.
  CPC .......... *H05B 37/0209* (2013.01); *G01S 19/13* (2013.01)

(58) Field of Classification Search
  CPC .. H05B 37/02; H05B 37/0209; H05B 37/029; H05B 37/0272; G01S 19/01; G01S 19/13; G01S 19/42; H04W 4/02; H04W 4/023
  See application file for complete search history.

(56) References Cited

U.S. PATENT DOCUMENTS

| | | | |
|---|---|---|---|
| 4,215,277 A | 7/1980 | Weiner et al. | |
| 5,254,908 A | 10/1993 | Alt et al. | |
| 5,629,587 A | 5/1997 | Gray et al. | |
| 6,242,096 B1 | 6/2001 | Wolter et al. | |
| 6,424,096 B1 * | 7/2002 | Lowe | H05B 37/0272 315/185 R |
| 10,321,541 B2 | 6/2019 | Bora et al. | |
| 2004/0075401 A1 | 4/2004 | Segan et al. | |
| 2004/0150994 A1 * | 8/2004 | Kazar | H05B 37/029 362/249.12 |
| 2004/0184354 A1 | 9/2004 | McDonald | |
| 2005/0040772 A1 * | 2/2005 | Guzman | H05B 33/0842 315/291 |
| 2008/0104533 A1 * | 5/2008 | List | A61B 5/055 715/771 |
| 2010/0124350 A1 * | 5/2010 | Militzer | E04B 2/7422 381/386 |
| 2014/0166447 A1 * | 6/2014 | Thea | H05B 37/0281 200/19.01 |
| 2015/0054413 A1 | 2/2015 | Chen | |
| 2016/0360597 A1 | 12/2016 | Greene | |
| 2017/0149180 A1 * | 5/2017 | Siegler | H01R 13/70 |

FOREIGN PATENT DOCUMENTS

WO  2012118950  8/2014

* cited by examiner

*Primary Examiner* — Thai Pham

(57) ABSTRACT

A multi-element lighting apparatus is described. The multi-element lighting apparatus comprises a receiver circuit for receiving a location associated with the multi-element lighting apparatus; a power switch having a plurality of prongs for receiving power; a power cord coupled to the power switch; and a plurality of lighting elements coupled to the power cord, wherein the power cord distributes the power received by the power switch; and wherein the power switch controls the application of power to the power cord based upon the location associated with the multi-element lighting apparatus.

20 Claims, 19 Drawing Sheets

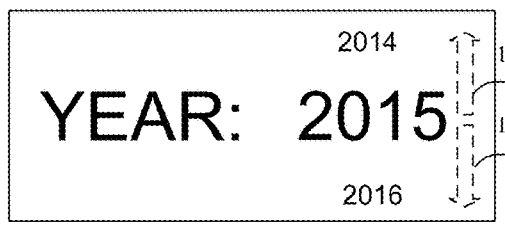
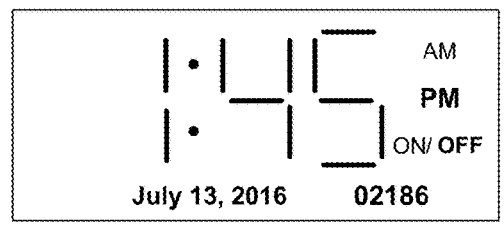
FIG. 24　　　　　　　　　　FIG. 25
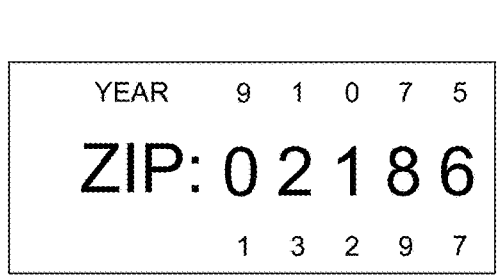
FIG. 26　　　　　　　　　　FIG. 27
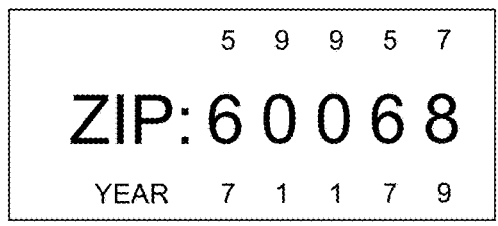
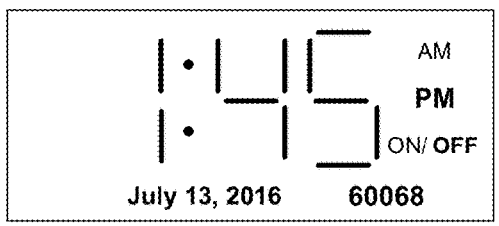
FIG. 28　　　　　　　　　　FIG. 29

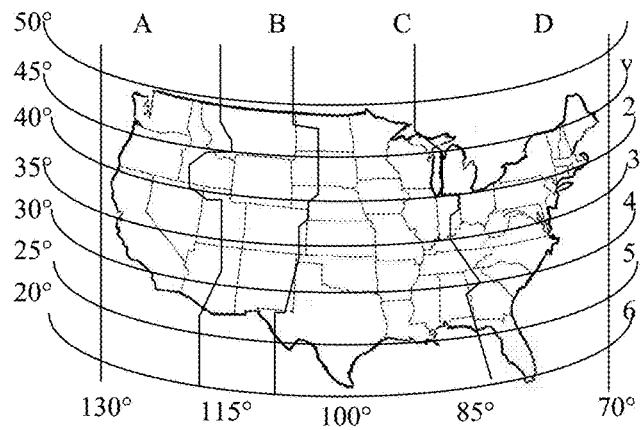

FIG. 57

| Latitude Range | Longitude Range | Region | Dusk/Dawn |
|---|---|---|---|
| 45°-50° | Pacific | A1 | Table A1 |
| 40°-45° | Pacific | A2 | Table A2 |
| ⋮ | ⋮ | ⋮ | ⋮ |
| 25°-30° | Pacific | A5 | Table A5 |
| 20°-25° | Pacific | A6 | Table A6 |
| 45°-50° | Mountain | B1 | Table B1 |
| ⋮ | ⋮ | ⋮ | ⋮ |
| 25°-30° | Mountain | B5 | Table B5 |
| 45°-50° | Central | C1 | Table C1 |
| 40°-45° | Central | C2 | Table C2 |
| ⋮ | ⋮ | ⋮ | ⋮ |
| 45°-50° | Eastern | D1 | Table D1 |
| ⋮ | ⋮ | ⋮ | ⋮ |
| 25°-30° | Eastern | D5 | Table D5 |
| 20°-25° | Eastern | D6 | Table D6 |

FIG. 58

| Date Range | Dawn | Dusk |
|---|---|---|
| DR1 | DAWN1 | DUSK1 |
| DR2 | DAWN2 | DUSK2 |
| ⋮ | ⋮ | ⋮ |
| DR20 | DAWN20 | DUSK20 |
| DR21 | DAWN21 | DUSK21 |
| ⋮ | ⋮ | ⋮ |
| DRN-1 | DAWNN-1 | DUSKN-1 |
| DRN | DAWNN | DUSKN |

MULTI-ELEMENT LIGHTING APPARATUS AND A METHOD OF IMPLEMENTING A MULTI-ELEMENT LIGHTING APPARATUS

RELATED APPLICATIONS

Applicant claims priority on provisional application U.S. Ser. No. 62/427,037, filed on Nov. 28, 2016, the entire application of which is incorporated by reference.

FIELD OF THE INVENTION

The present invention relates generally to lighting control products, and in particular, to a multi-element light apparatus and a method of implementing a multi-element light apparatus.

BACKGROUND OF THE INVENTION

Programming timers that are used to supply power to a light or other appliance can often be difficult. For example, a user of a timer often has to go through a multi-tier menu to enable the programming of the timer. If the user is not familiar with the menu, the user may have a difficult time understanding next steps in the programming process, or how to return to a previous step. Users may become so frustrated with the programming process that they may decide not to use a timer.

However, timers can be very beneficial in many circumstances, not only for the purpose of reducing power consumption, but also from an aesthetic standpoint in inside and outside home decor. While trained electricians and experienced "do-it-yourselfers" may be able to program timers without having to rely on a manual, individuals who don't use timers often will likely have to rely on a manual, which may lead to a delay in setting the timers, or may result in the timers never being set at all.

One particular application of timers which can lead to significant difficulties for users is the use of timers for holiday decorations, in which case the timers may only be used for a month at a particular time of year, such as the month of December. During the busy time of the holiday season, people are not often willing to spend a lot of time to set up for lights, and particularly timers on the lights. People who set up these lights are often unfamiliar with the use of timers and would prefer a simple approach in controlling their lights.

Accordingly, improved power switches and methods of implementing power switches are beneficial.

SUMMARY OF THE INVENTION

A multi-element lighting apparatus is described. The multi-element lighting apparatus comprises a receiver circuit for receiving a location associated with the multi-element lighting apparatus; a power switch having a plurality of prongs for receiving power; a power cord coupled to the power switch; and a plurality of lighting elements coupled to the power cord, wherein the power cord distributes the power received by the power switch; and wherein the power switch controls the application of power to the power cord based upon the location associated with the multi-element lighting apparatus.

Another multi-element lighting apparatus comprises a power switch having a plurality of prongs for receiving power; a power cord coupled to the power switch; a terminal end of the power cord having a receiver for receiving a location associated with the multi-element lighting apparatus; and a plurality of lighting elements coupled to the power cord, wherein the power cord distributes the power received by the power switch; and wherein the power switch controls the application of power to the power cord based upon the location associated with the multi-element lighting apparatus.

A method of implementing multi-element lighting apparatus is disclosed. The method comprises receiving power at a power switch; coupling the power switch to a power cord; implementing a plurality of lighting elements coupled to the power cord, wherein the power cord distributes the power received by the power switch; and receiving a location associated with the multi-element lighting apparatus; wherein the power switch controls the application of power to the power cord based upon the location associated with the multi-element lighting apparatus.

BRIEF DESCRIPTION OF THE DRAWINGS

FIG. 24 is a view of a display showing the selection of the year on the user interface of the power switch;

FIG. 25 is a view of a display showing the selected day of Jul. 13, 2016 on the user interface of the power switch;

FIG. 26 is a view of a display showing the selection of a location, such as a ZIP Code, on the user interface of the power switch;

FIG. 27 is a view of a display showing the changing of the first digit of the ZIP Code on the user interface of the power switch;

FIG. 28 is a view of a display showing the final selected ZIP Code after all five digits of the ZIP Code have been changed;

FIG. 29 is a view of a display showing the finally selected time, date and location information on the user interface of the power switch;

FIG. 57 is a map showing the division of the geographical area of the map into a plurality of regions;

FIG. 58 is a table showing the definition of the plurality of regions and associated tables with the regions;

FIG. 59 is an example of a table that could be implemented as any one of the tables of FIG. 58;

DETAILED DESCRIPTION OF THE DRAWINGS

Figure 1:
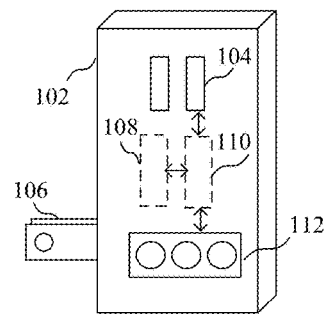
FIG. 1 is a perspective view of a power switch that plugs directly into a power outlet.

Turning first to FIG. 1, a perspective view of a power switch that plugs directly into a power outlet is shown. More particularly, a power switch 102 comprises a receptacle 104, also known as an outlet, adapted to receive prongs of a device to be powered, such as a lamp or other appliance for example. The power switch 102 also comprises prongs 106, also known as a plug, that are adapted to be inserted into an electrical outlet to provide power to the power switch 102. The power switch 102 may also comprise internal circuitry, including receiver circuit 108 adapted to receive operational information, such as time, date and location information for example, and a control circuit 110. Operational information could be any information that enables a timer to correctly implement a timing pattern. The operational information may be entered by a user or received from another device, as will be described in more detail below. Examples of operational information could include one or all of a time, a date and a location. For example, a timing pattern having a switching event to turn a light on at 9:00 PM and turn the light off at dawn would not be implemented correctly by the timer if a control circuit of the timer does not know the correct current time to be able to turn the light on at 9:00 PM or each of the date and the location to be able to turn the light off at dawn. Therefore, the operational information (e.g. current time, date and location) enables the correct implementation of the timing pattern (e.g. to turn the light on at 9:00 PM and then turn the light off at dawn). It should be noted that different receiver circuits implemented in the various devices may receive different type of information, and may be selected based upon a variety of factors, including cost and the type of information that is received. Further, particular applications may only require certain types of information, and therefore the receiver circuit for the power switch may be selected based upon the type of information that is necessary. If a particular receiver circuit has a reduced set of information that could be provided to the control circuit of a power switch, a user may select that receiver circuit if it provides enough information and is available at a lower cost. In some applications which relate to holiday lighting during December and January, a date may not be necessary for applications requiring dusk and dawn for example because dusk and dawn may be approximated for the December and January time period. Therefore, a receiver circuit receiving a reduced set of data could be implemented at a lower cost and still provide sufficient information for a particular application. While particular applications of a power switch described below may indicate that time, date and location would be received by the receiver circuit, it should be understood that receiver circuits having reduced features could be implemented if not all of the time, date and location information is required, such as for holiday lighting which may not require date information. Alternatively, while a receiver circuit may provide each of the time, date and location, a particular application may only require one or two of the time, date and location information, and therefore only use some of the operational information that is received. Further, it should be understood that for a receiver circuit receiving only one or two of the time, date and location information, the receiver circuit may only use one of time, date and location if only one is needed.

It should be noted that one or more of time, date and location information could be received (i.e. without a user having to enter the information) from a variety of sources. For example, one or more of the time, date and location could be received from a satellite network, such as a global positioning system (GPS) network of satellites of the global navigation satellite system (GLONASS). Alternatively, one or more of the time, date and location information could be received from a cellular network or other wireless communication network. The data could be received by way of a single service provider or multiple service providers of the wireless communication network. The data could be received from a single element of the network, such as a single base station, or from multiple elements, such as through triangulation using multiple base stations. One or more of the time, date and location information could be received using any other wireless or wired communication network accessible by a device, such as AM radio, FM radio, Ham radio, signals associated with an atomic clock, any signals in the radio frequency portion of the electromagnetic spectrum, or any combination of these various signals. The signals could be received by the receiver circuit 108, which may be a circuit for receiving a particular type of signal, such as a GPS or cellular signal. For example, the circuit for receiving a GPS signal may be a GPS receiver circuit implemented as an integrated circuit (IC) chip, which may be available from SiRF Technology, Inc. for example. It should also be noted that information, such as time, date and location information or any other information enabling the operation of the power switch, could be received from a near field communication (NFC) transmitter at a NFC receiver circuit in the power switch.

An optional control element 112 is located on the power switch 102 and is accessible to a user to enable setting timing parameters for applying power to lights, an appliance, or any other electrical device plugged into the receptacle 104. While specific references may be made to providing power to lights below by way of example, it should be understood that the various circuits and methods could be implemented to control any device receiving electrical power. While the general arrangement of elements of the power switch 102 is provided by way of example, it should be understood that the configuration and inclusion of elements of the power switch 102 could be implemented differently. As will further be described in more detail below, various combinations of the receiver circuit 108, the control circuit 110, and the optional control element 112 could be any type of actuator, such as a dial or switch, or any other type of user interface as set forth in more detail below to enable the application of power to lights. The control circuit enables the application of power to the receptacle based upon the timing parameters or other information, such as time, date and location information received by the receiver circuit 108.

Figure 2:
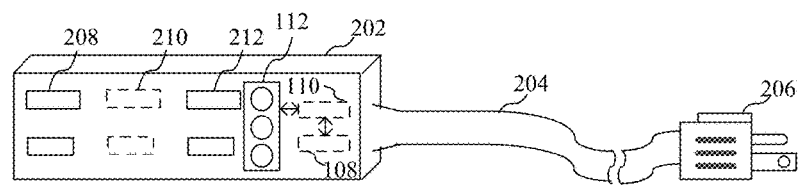
FIG. 2 is a perspective view of a power switch having a power cord.

Turning now to FIG. 2, a perspective view of a power switch having a power cord is shown. As shown in the implementation of a power switch of FIG. 2, a power switch 202 could be implemented with a power cord 204 that is coupled to a plug 206. While the implementation of FIG. 1 shows a two-pronged plug and the implementation of FIG. 2 shows a three-pronged plug, it should be understood that the various embodiments set forth below could be implemented with any number and type of prong configurations as implemented anywhere or by any electrical standard. The power switch 202 comprises a plurality of outlets 208-212, also known as receptacles, where the outlet 210 is shown in dashed lines to indicate that it is on the backside of the power switch 202.

Figure 3:
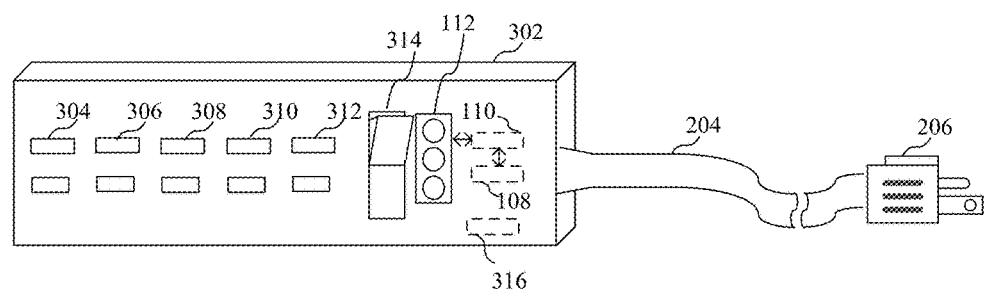
FIG. 3 is a perspective view of a power switch associated with a power strip having a power cord.

Turning now to FIG. 3, a perspective view of a power switch associated with a power strip having a power cord is shown. The implementation of FIG. 3 is similar to that of FIG. 2, where a greater number of outlets 304-312 are included on the power strip. The power strip may also include an additional voltage protection circuits 316 or additional user interface elements, such as a control switch 314, as will be described in more detail below in reference to FIG. 9. The control switch 314 may be an on/off switch, while the control element 112 could be any type of user interface described below, or some other suitable user interface.

Figure 4:
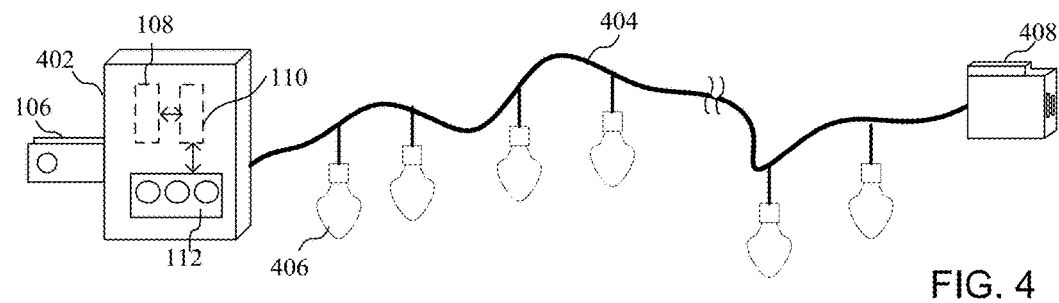
FIG. 4 is a perspective view of a string of lights having a power switch and an outlet adapter.
Figure 5:
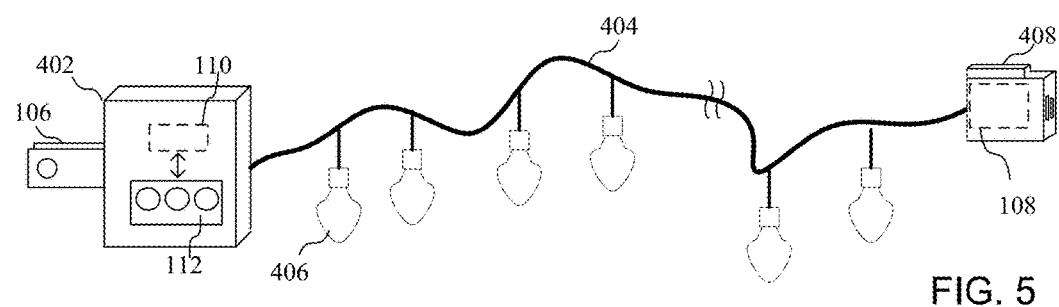
FIG. 5 is a perspective view of a string of lights having a power switch and a location circuit at an end of the string of lights having an outlet adapter.

Turning now to FIGS. 4-7, a multi-element lighting apparatus is shown. By way of example as shown in FIGS. 4-7, the multi-element lighting apparatus comprise a string of lights 404. While a string of lights is shown by way of example, it should be understood that a multi-element lighting apparatus could be implemented in other configurations, including other configurations of an apparatus having a cord and a plurality of lighting elements. Turning first to FIG. 4, a perspective view of a string of lights having a power switch is shown. According to the implementation of FIG. 4, a power switch 402 comprises a string of lights 404 having a plurality of bulbs 406. The string of lights terminates at an outlet adapter 408 for receiving another string of lights. That is, the string of lights of FIG. 4 could receive a plurality of strings of lights that are coupled in series, such as conventional decorative lights used for holiday decorations or outdoor strings of lights that may be used to light a patio or outdoor eating area. As shown in the implementation of FIG. 5, the receiver circuit 108 could be implemented as a part of the outlet adapter 408. By placing the receiver circuit 108 at the end of the string of lights, it may be easier to acquire operational information such as time, date and location information or any other information received by the receiver circuit 108. For example, if a GPS circuit or a circuit adapted to receive a wireless communication signal such as a cellular telephone signal is implemented as the receiver circuit 108, the receiver circuit may have greater success in receiving the GPS or cellular signal when implemented away from the power switch. The implementation of FIG. 5 may be particularly useful in the case where the string of lights having the power switch is plugged into an outlet that may be blocked from "a line of sight" view of a satellite, such as when plugged into an outlet that is under a covered porch. While the control circuit 110 and the optional control element 112 are shown as being implemented on the power switch 402, it should be understood that the control circuit 110 and the optional control element 112 could instead be implemented on the outlet adapter 408. While particular arrangements of a power switch are shown in FIGS. 1-5, it should be understood that these power switches are shown by way of example, and could be implemented in a variety of ways within the spirit and scope of the present disclosure. As will become apparent in reference to the additional details below, the power switch arrangements of FIGS. 1-5 enable a simplified operation for implementing a timing pattern for lights or some other appliance coupled to the power switch.

Figure 6:
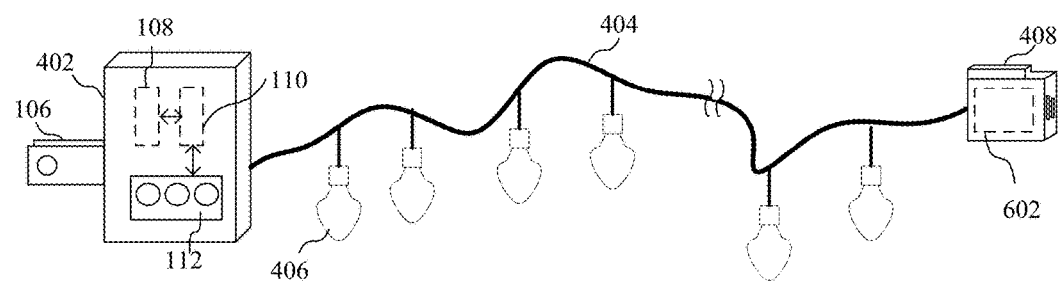
FIG. 6 is a perspective view of a string of lights having a power switch and a sensor.
Figure 7:
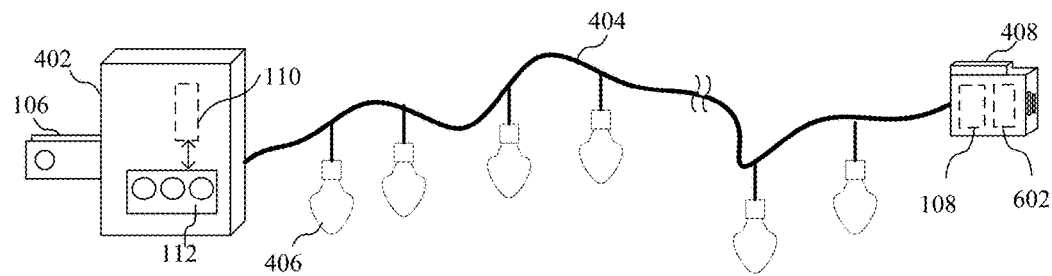
FIG. 7 is a perspective view of a string of lights having a receiver circuit, a power switch and a sensor.

Turning now to FIG. 6, a perspective view of a string of lights having a sensor is shown. As shown in FIG. 6, a sensor 602 is implemented in the outlet adapter. The sensor could be any type of sensor that would change the on/off state of the light string. For example, the sensor could be a motion detector and turn on the light string if motion is detected by the sensor when the lights on the light string are off. The sensor could also be an ambient light detector for turning lights on at dusk and off at dawn. The sensor could also be a combination of a motion detector and an ambient light detector. The ambient light detector could be used to determine a time period during which the lights would be turned on in response to motion detected by the motion detector. That is, because it would not be necessary to turn on the lights when it is light out, the operation of the motion detector could be used in conjunction with the ambient light detector. As shown in FIG. 7, a string of lights could be implemented with a receiver circuit 108 and a sensor 602 in the outlet adapter 408. The sensor 602 could include a camera, a microphone and a speaker to enable capturing both audio and video, as will be described in more detail below in reference to FIG. 8.

Figure 8:
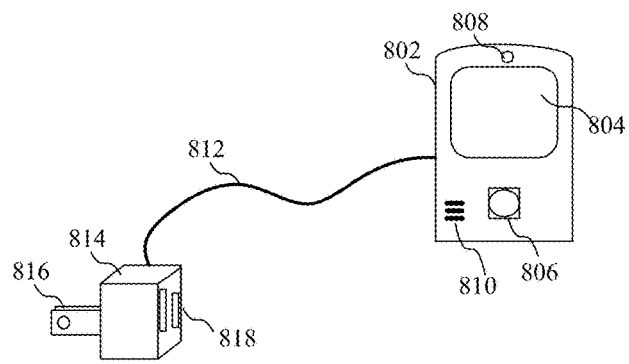
FIG. 8 is a perspective view of a sensor such as a motion detector which can be attached between a pair of strings of lights or at an end of a string of lights.

Turning now to FIG. 8, a perspective view of a sensor which could be attached between a pair of strings of lights or at an end of a string of lights. As shown in FIG. 8, a sensor 802 comprises a sensor element 804, which could be a motion detector or an ambient light detector for example. If implemented using a motion detector, the sensor 802 could include a camera 806, a microphone 808 and a speaker 810 to not only record video of a scene associated with the sensor, but also enable real-time, two-way communication with someone near the sensor. A cord 812 may be provided between the sensor 802 and an adapter 814. The adapter 814 comprises prongs 816 and an outlet 818 to enable the adapter 814 to be plugged in to the end of a light string or between two light strings that are connected in a series of light strings. Alternatively, the prongs 816 and outlet 818 could be implemented in the housing of the sensor 802. Data, including audio and video data could be provided over the power lines of the cord 812 from a transmitter in the sensor 802 to a receiver circuit of the string of lights, where the receiver circuit may be coupled to a control circuit of the string of lights. However, it should be understood that communication between the sensor 802 and a control circuit associated with the light string could be by way of a wireless connection, such as a Bluetooth connection.

Figure 9:
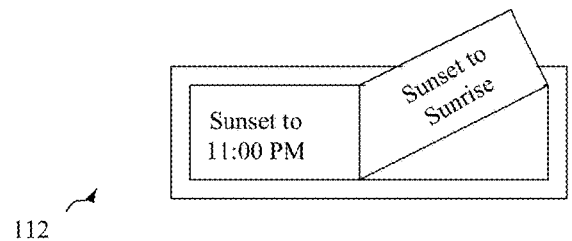
FIG. 9 is a perspective view of a toggle switch implemented as a control element of a power switch.

Turning now to FIG. 9, a perspective view of a toggle switch implemented as a control element of a power switch is shown. According to the implementation of FIG. 9, the control element 112 may be implemented as a simple toggle switch, shown here enabling the selection of one of two timing patterns. By way of example, a user may be able to select a timing pattern of "Sunset to 11:00 PM" or "Sunset to Sunrise," for example. The use of a toggle switch as shown in FIG. 9 enables the simple implementation of a power switch for applying power to a string of lights, such as lights associated with holiday decorations. That is, it is likely that people who implement holiday lights or other outdoor lights would likely choose the same general timing patterns. By using a toggle switch that enables the selection of a predetermined timing pattern that is likely to be used by many users, the user does not have to enter a desired timing pattern on the power switch. While the particular selections of the "Sunset to 11:00 PM" or "Sunset to Sunrise" timing patterns options are shown in FIG. 9, it should be understood that other on and off timing patterns could be implemented, and that the particular selection shown in FIG. 9 is merely shown by way of example. The toggle switch of FIG. 9 could also be implemented as the switch 314 separate from the control element 112, as shown for example in the power cord of FIG. 3.

Figure 10:
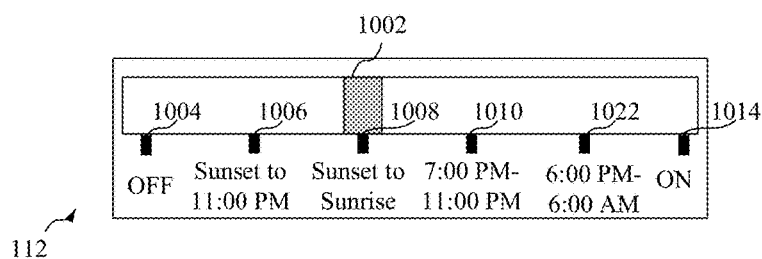
FIG. 10 is a perspective view of a sliding switch implemented as a control element of a power switch.

Turning now to FIG. 10, a perspective view of a sliding switch implemented as a control element of a power switch is shown. More particularly, a sliding switch 1002 is movable between a plurality of locations that are associated with different timing patterns or states of the power adaptor. By way of example, the switch 1002 may be moved between different timing patterns designated by locations 1004 through 1014. As shown in FIG. 10, these different locations enable the selection of different timing patterns, including "OFF," "Sunset to 11:00 PM," "Sunset to Sunrise," "7:00 PM-11:00 PM," "6:00 PM-6:00 AM," and "ON." While 4 available timing patterns and on and off options are shown by way of example in FIG. 10, it should be understood that fewer or additional timing patterns or other states could be selected.

Figure 11:
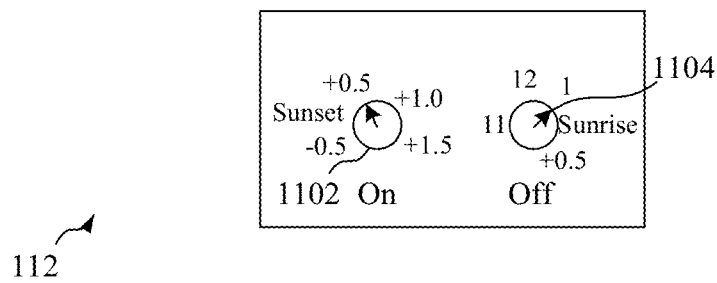
FIG. 11 is a perspective view of user interface having dials implemented as a control element of a power switch.

Turning now to FIG. 11, a perspective view of user interface having dials implemented as a control element of a power switch is shown. According to the implementation of FIG. 11, dials could be used to easily set an on time or an off time. As shown by way of example, an on time dial 1102 enables the selection of an on time with respect to sunset, where a user could select sunset as the on time, or a predetermined half hour period before or after sunset. Similarly, the off time could be selected using a dial 1104, where the off time could be selected as sunrise or a predetermined period before or after sunrise. Alternatively, predetermined times could be selected for the on and off times. For example, an on time could be selected as a fixed time between 6 PM and 11 PM by moving the dial to the desired time. Similarly, an off time could be selected between 11 PM and 5 AM by selecting the desired off time. While 2 dials are shown by way of example, additional pairs of dials enabling multiple on and off times could be implemented and the specific settings could vary from those shown.

Figure 12:
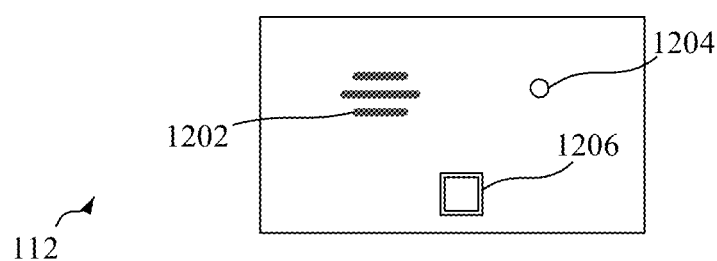
FIG. 12 is a perspective view of user interface having a microphone and speaker implemented as elements of a power switch.
Figure 47:
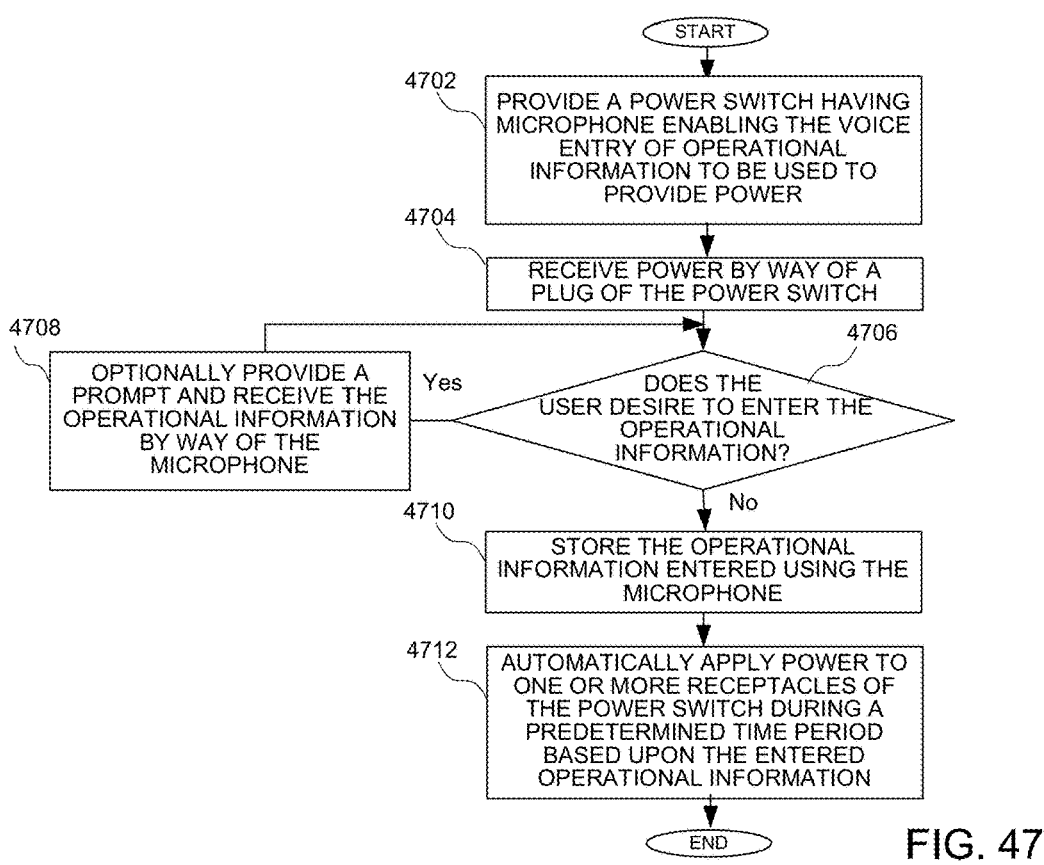
FIG. 47 is a flow chart showing another method of using voice recognition to store operational information such as time, date and location information to enable automatically applying powers to one or more receptacles of a power switch.

Turning now to FIG. 12, a perspective view of a user interface having a microphone and speaker implemented as elements of a power switch is shown. As shown in the implementation of FIG. 12, a voice activated user interface enables the input of operational information, such as current time, date and location information as well as timing pattern information, to the power switch. More particularly, a speaker 1202 and a microphone 1204, which is a control element, enable the entry of information necessary for the power switch to apply power to the receptacle at the appropriate times. The speaker 1202 may be used to implement prompts for a user to enter particular data, which may be detected by the microphone 1204. The button 1206 may be used to enable a user to sequentially request a prompt from the power switch, in response to which a user could enter the requested data. An example of a power switch implementing user prompts will be provided in more detail below in reference to FIG. 47.

While the speaker 1202 and button 1206 are shown, it should be understood that the control element 112 of FIG. 12, could include only the microphone 1204, where a user could simply dictate the desired information which would be deciphered by the power switch. That is, the user could simply indicate the time, date and location, and a control circuit of the power switch would determine the correct time, date and location based upon the users entered information. It would not be necessary that the user enter any data in any particular order, or any particular type of data. The control circuit would be configured to detect and decode various types of information provided. For example, the user could enter time within an AM/PM designation, or as military time. The control circuit would determine the correct time based upon the entered information. Similarly, the date could be determined simply based upon a month entered by a user, or a series of numbers which would be determined to be a date, such as "nine eleven twenty sixteen" which would be interpreted in Sep. 11, 2016. Similarly, location could be based upon ZIP Code, longitude and latitude designations, a geographic region, a portion of a state, well-known cities, or any other geographic location. If the control circuit cannot decode an entry of a user, the control circuit could then add a prompt to provide the information in a certain format. Information associated with a timing pattern could also be dictated by the user. For example, a user could dictate a timing events associated with a timing pattern, such as an on or off times or dusk and dawn as on or off times, for particular day of the week, or predetermined groupings of an on and off times, such as weekdays or weekends.

Figure 13:
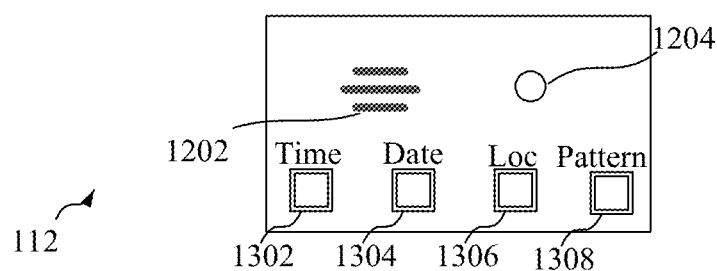
FIG. 13 is a perspective view of user interface having a plurality of buttons enabling the entry of different data using a microphone and speaker implemented as elements of a power switch.

Turning now to FIG. 13, a perspective view of a user interface having a plurality of buttons enabling the entry of different data using a microphone and speaker implemented as an element of a power switch is shown. While the implementation of FIG. 12 would enable a user to sequentially press the button 1206, leading to a prompt from the control circuit to enter a certain type of data (for example, a prompt for a current time, followed by a prompt for a current date, followed by a prompt for a location in a particular format), a timing pattern, or any other information that may be useful in implementing the device, the implementation of FIG. 13 could provide three separate buttons, with one button enabling the entry of each of the time, date or location information. More particularly, button 1302 could be selected to enable the entry of a current time, button 1304 could be selected to enable the entry of the date, and button 1306 could be selected to enable entry of a location. A separate button 1308 could be added to enable a user to dictate a timing pattern. The timing pattern could be provided in response to prompts from the timer, or as a straight dictation from the user that would be deciphered by a control circuit of the device.

Figure 14:
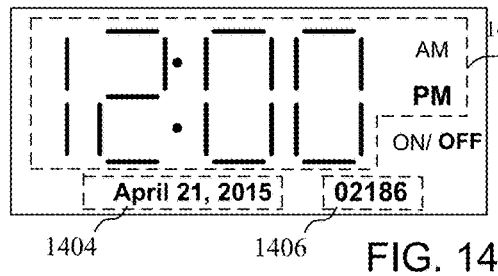
FIG. 14 is a view of a display showing programmable fields of a user interface of a power switch.
Figure 15:
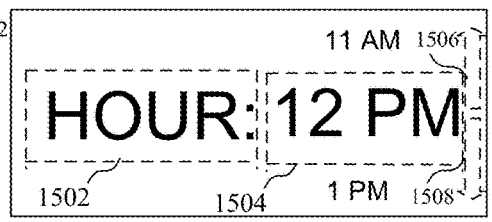
FIG. 15 is a view of a display showing a selectable hour field of a user interface of a power switch.
Figure 16:
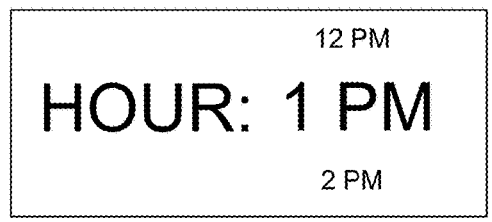
FIG. 16 is a view of a display showing the changing of the hour from 12 PM to 1 PM of the user interface of the power switch.
Figure 17:
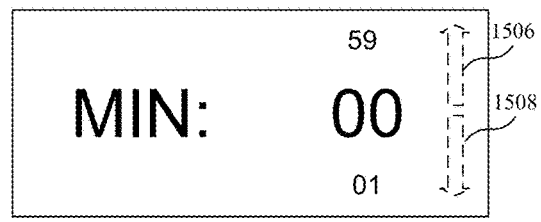
FIG. 17 is a view of a display showing a selectable minute field of a user interface of the power switch.
Figure 18:
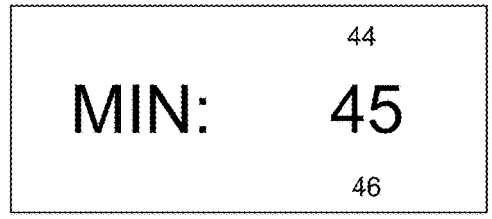
FIG. 18 is a view of a display showing a changing of the minutes from 0 to 45 of the user interface of the power switch.
Figure 19:
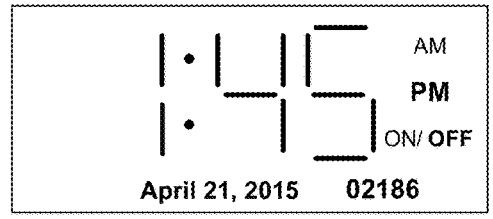
FIG. 19 is a view of a display showing the selected time of one hour and 45 minutes.
Figure 20:
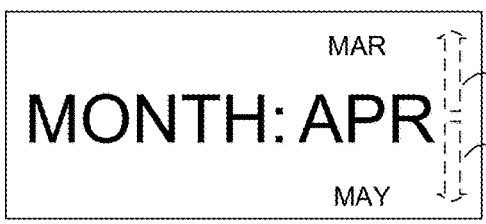
FIG. 20 is a view of a display showing a selectable month field of a user interface of the power switch.

Turning now to FIGS. 14-29, various views of a display show programmable elements of a user interface of a power switch, and could be implemented in any of the power switches set forth herein which may have a display, or any other suitable power switches. A display having particular fields that could be selected and modified is shown in FIG. 14. More particularly, the display comprises a time field 1402, a date field 1404, and a location field 1406. Each of the fields could be selected by touching the field, such as any location within the dashed box associated with the field as shown in FIG. 14. When time field 1402 is selected, a designation region 1502 indicates the type of data that follows in the data field 1504. Initially, the hour designation would be displayed, with the current time that is stored being displayed in the data field. A previous or following time could be shown above and below the current time as shown in FIG. 15. A user could then "swipe" the data to change the data, as shown by the dashed arrow 1506 and 1508 representing an upward swipe or a downward swipe. Accordingly, if a user slightly swipes upward, the time will change from 12 PM to 1 PM. The user could then select the hour field 1502 again to "store" the hour time, as shown in FIG. 16, leading to the presentation of the "minutes" field as shown in FIG. 17. While the current minutes in FIG. 17 is shown as 00, a user could swipe either upward or downward to reach the 45 minute designation. After the minutes field is selected as shown in FIG. 18, the display will then show the current time as shown in FIG. 19.

Figure 21:
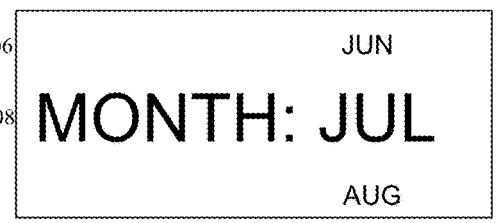
FIG. 21 is a view of a display showing the changing of the month from April to July on the user interface of the power switch.
Figure 22:
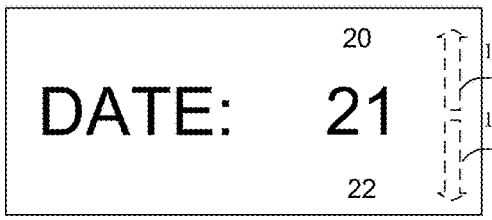
FIG. 22 is a view of a display showing the selection of a date on the user interface of the power switch.
Figure 23:
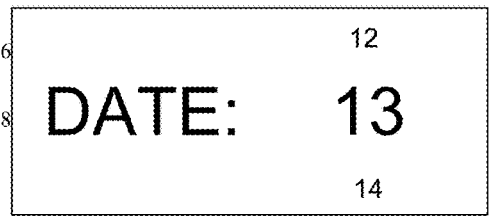
FIG. 23 is a view of a display showing the change in the date from 21 to 13 on the user interface of the power switch.

A user could then select the current date as shown in FIGS. 20-25. In particular, when the date field is selected, the month is initially designated, shown as being April in FIG. 20. The user could then swipe up or down to reach July as shown in FIG. 21. When the user stores the month of July, the date will then be displayed as shown in FIG. 22. The user could then change the date from 21 to 13 as shown in FIG. 23. After the date field is selected to store the current entry of 21, the year will be displayed as shown in FIG. 24. After the year changes from 2015 to 2016, the data is stored as shown in the final display of FIG. 25.

Finally, the user could enter a current location, shown in FIG. 26 as a ZIP Code. Starting from an initial ZIP Code of 02186, the user could swipe the individual digits of the ZIP Code, where the value zero of the first digit is changed from 0 to 6 as shown in FIG. 27. After all the digits are changed, a ZIP Code 60068 is shown in FIG. 28, where the final time, date and location are shown in FIG. 29. While particular methods of changing the data are shown by way of example in FIGS. 14 through 29, it should be understood that other methods of changing the data on a touch screen or by way of some other means could be employed. Additional implementations of a touch screen user are shown in more detail below in reference to FIGS. 30-36 and FIGS. 60-62.

Figure 30:
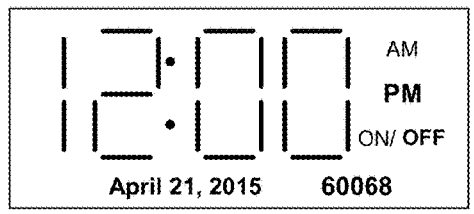
FIG. 30 is a view of a display showing an initial display on a touch screen user interface of a power switch.
Figure 31:
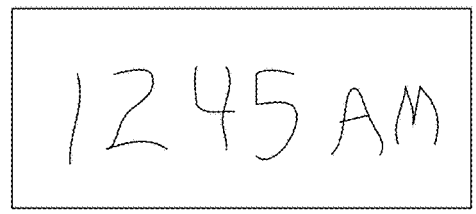
FIG. 31 is a view of a touch screen display showing the text input of 12:45 AM after the selection of the time field of the user interface of FIG. 30.
Figure 32:
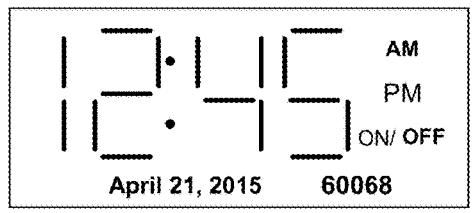
FIG. 32 is a view of a display showing the updated user interface having the current time at 12:45 AM after text recognition of the text input.
Figure 33:
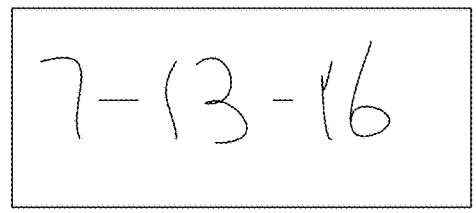
FIG. 33 is a view of a display showing the text input of the date of Jul. 13, 2016.
Figure 34:
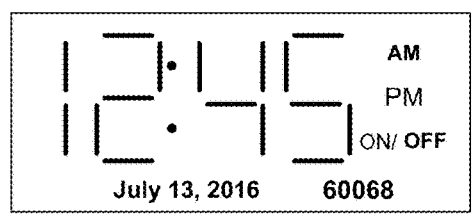
FIG. 34 is a view of a display showing the updated entry of Jul. 13, 2016 on the user interface.
Figure 35:
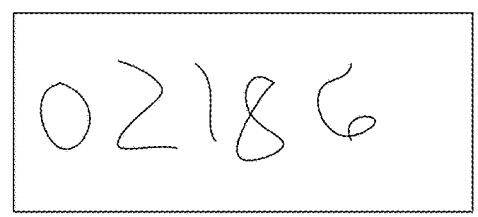
FIG. 35 is a view of a display showing the text input having the entry of the ZIP Code of 02186.
Figure 36:
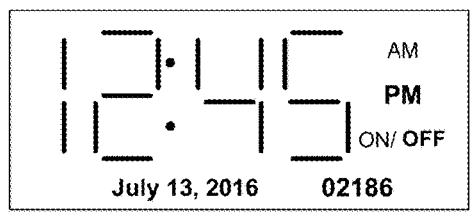
FIG. 36 is a view of a display showing the final display having the correct time, date and ZIP Code.

Turning now to FIGS. 30-36, various views of a display show displays on a touch screen user interface of a power switch. More particularly, when the time field of the touch screen display of FIG. 30 is selected, the user could enter the date by "writing" the current time on the display using an index finger or a stylus, for example, where the power switch would implement hand writing detection, also known as text recognition, to interpret the handwriting input. The current time could then be stored in response to a timeout, or in response to the control circuit determining that a current time has been entered. For example, the control circuit could determine that enough digits or other designations such as AM or PM have been entered in order to store the information as shown in FIG. 32 with the updated time. The date could be entered as shown in FIG. 33 in response to the selection of the date field. After the correct date of Jul. 13, 2016 is entered, the correct date is then provided in the date field as shown in FIG. 35. Finally, a ZIP Code of 02186 as shown in FIG. 34 could be entered on the touch screen display, where a final display of the correct date is shown in FIG. 36. While the ZIP Code is shown by way of example as the data used to indicate a location, it should be understood that other location information could be used as described above. Also, the time and date could be entered or displayed according to different criteria.

Figure 37:
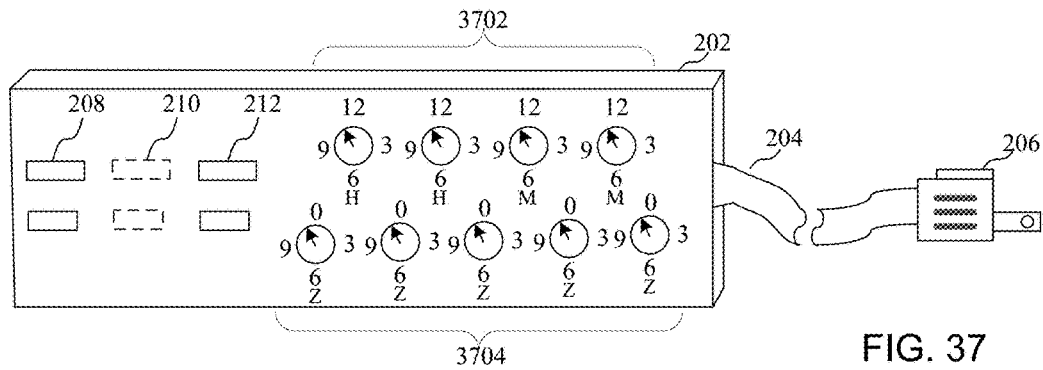
FIG. 37 is a plan view showing a power cord having a user interface with dials enabling the selection of operational information, such as a time and location.

Turning now to FIG. 37, a plan view shows a power cord having a user interface with dials enabling the selection of operational information such as a time and location. The implementation of FIG. 37 relates to a power strip having dials enabling the selection of time and location. The time in the top four dials of a block of dials 3702 could include two digits for an hour and two digits for a minute of the current time, where the time could be entered as military time. The location could then be entered according to a ZIP Code of a block of dials 3704. While four digits are shown for enabling the entry of time and five digits are shown for enabling the entry of location, it should be understood that fewer or greater number of dials could be implemented to enter the desired data. While dials associated with a date are not shown, it should be understood that dials for entering a date could be included. For example, 6 dials for entering a date in mm/dd/yy format could be implemented. However, the implementation of FIG. 37, could be used with holiday decorations, where it would be assumed that the power switch would be used in the month of December.

Figure 38:
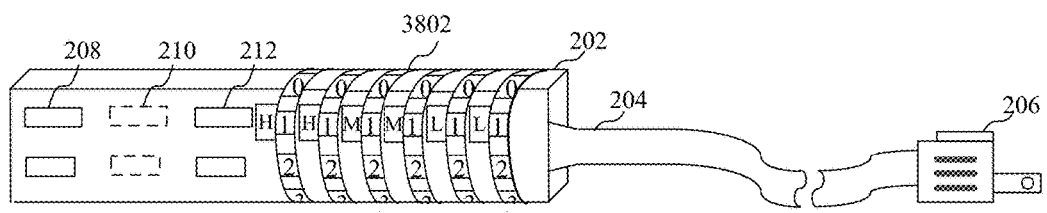
FIG. 38 is a plan view showing another power cord having dials enabling the selection of operational information, such as a time and location.
Figure 39:
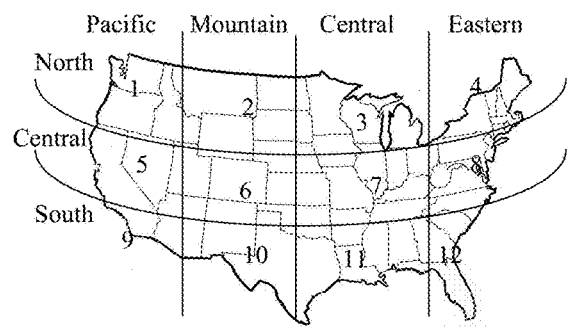
FIG. 39 is a map of the United States showing regions associated with corresponding numbers.

As shown in the implementation of FIG. 38 associated with a power cord 202, dials could rotate around the body of the power cord to select the correct hour, minute and location. As shown in the implementation of FIG. 38, only 2 digits are used to indicate location, which could be one of 12 regions as designated in FIG. 39. While only 12 regions are designated, it should be understood that greater or fewer number regions could be designated and assigned a corresponding number. However, it should be understood that other designations could be used to indicate location, such as letters associated with states for example.

Figure 40:
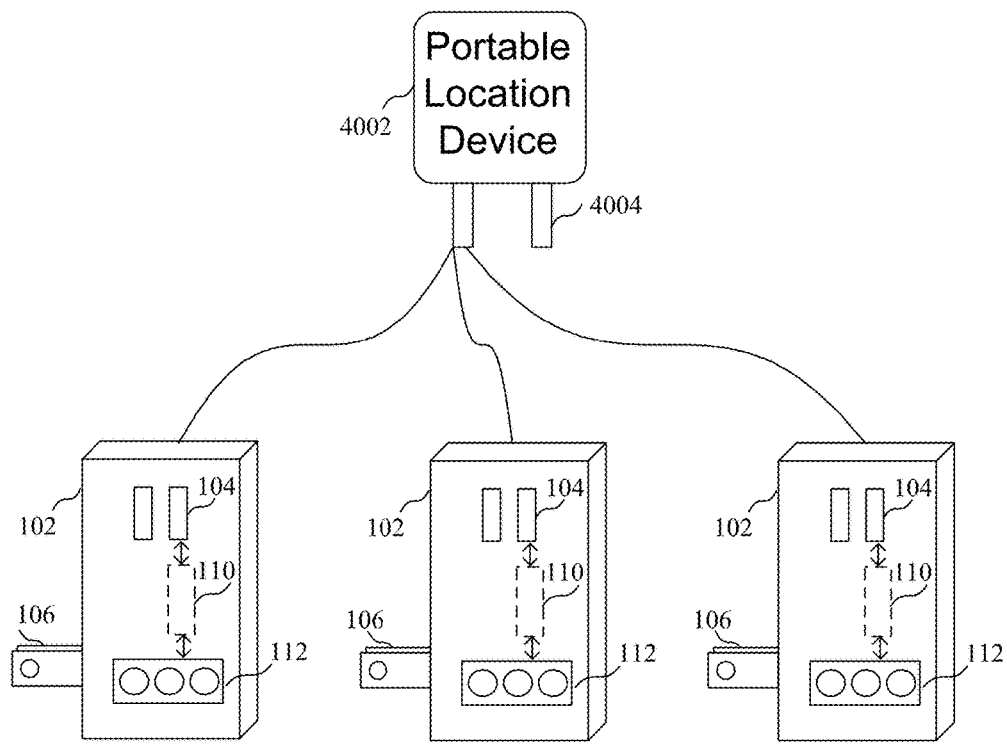
FIG. 40 is a plan view showing a plurality of power switches adapted to receive operational information such as time, date and location information, from a portable location device.

Turning now to FIG. 40, a plan view shows a plurality of power switches adapted to receive operational information, including at least one of the time, date and location, from a portable location device. According to the implementation of FIG. 40, a portable location device 4002 enables a user to provide operational information, which may include time, date and location information, to a plurality of powers switches 102. The portable location device 4002 could be for example a GPS device, or a cellular receiver adapted to receive operational information from a cellular tower which includes time, date and location information. The portable location device 4002 preferably includes prongs 4004 which could be inserted into an outlet 104 of the power switch 102. The prongs 4004 could also serve as a means for charging the portable location device 4002 by inserting the prongs into an electrical outlet, such as a wall outlet that provides power. The portable location device 4002, after being charged, could be removed from the electrical outlet and be moved to a location enabling the device to receive a signal having at least one of time, data and location information, which would then be transmitted to the power switch 102. The portable location device 4002 would transmit signals that would be detected on the power lines associated with the outlet 104 by the control circuit 110 via the prongs 4004. The information, which could include time, date and location, could be automatically downloaded in response to inserting the prongs 4004 of the portable location device 4002 into the receptacle 104. One benefit of providing a portable location device 4002 is that it could reduce the overall cost of the system by enabling the sharing of the portable location device 4002 between multiple devices. That is, each of the power switches 102 does not need a separate circuit for providing operational information, but could share one between any number of power switches.

Figure 41:
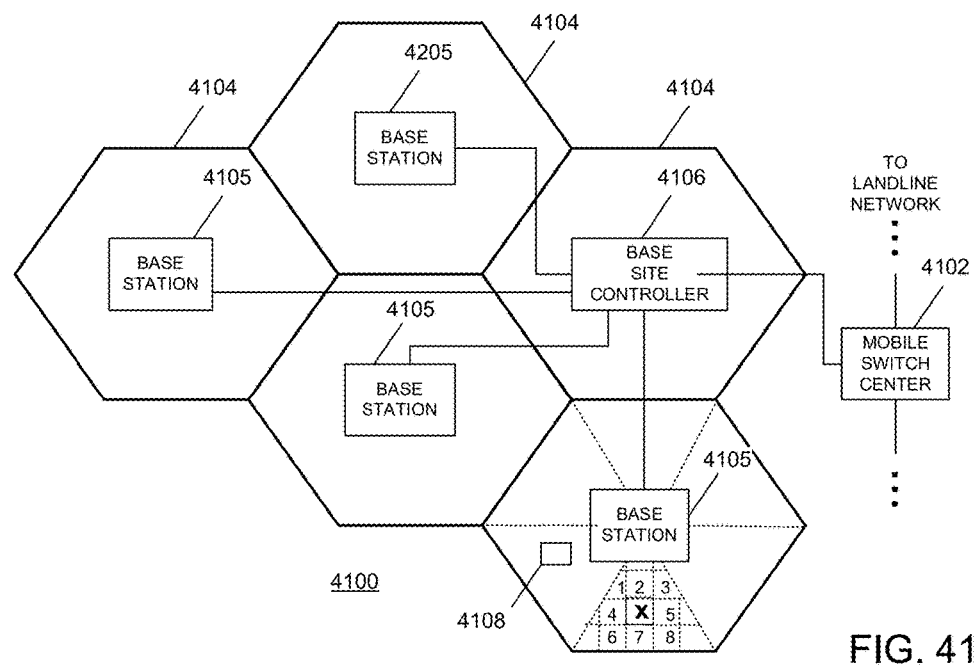
FIG. 41 is a diagram showing a wireless communication network enabling the receipt of operational information at a power switch.

Turning now to FIG. 41, a diagram shows a wireless communication network enabling the receipt of operational information at a power switch. More particularly, the network 4100, such as a cellular network, includes a plurality of regions 4104, typically referred to as cells, each of which has a base station 4105. A receiver circuit 4108 of a power switch 4102 could receive information, which may include time, date and a geographical location, from a base station or other element of the wireless network. By way of example, a cellular receiver could be implemented in an integrated circuit chip or module, such as a chip or module available from u-blox Holding AG of Thalwil, Switzerland.

Figure 42:
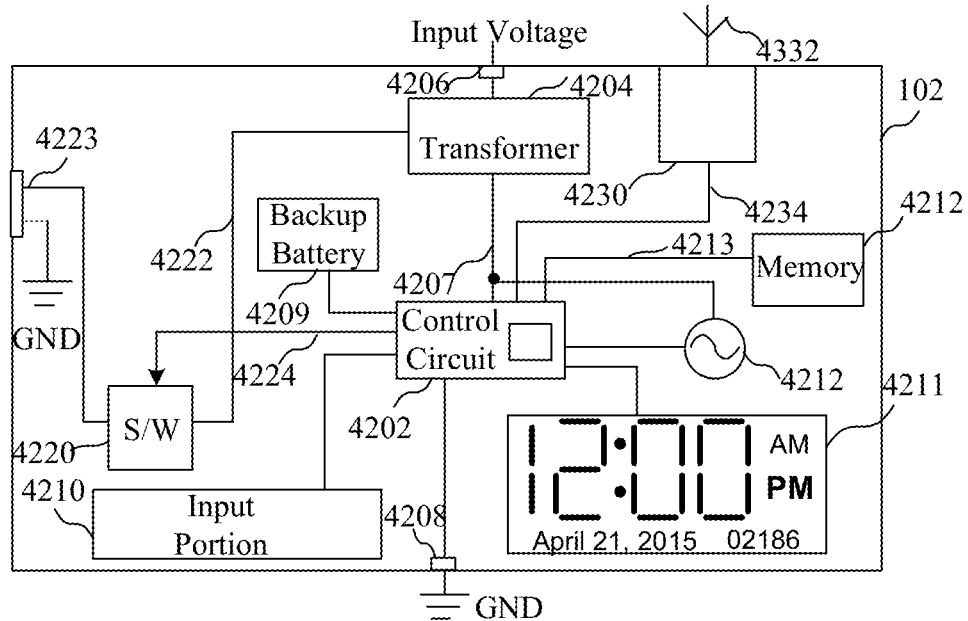
FIG. 42 is a block diagram of a power switch.

Turning now to FIG. 42, a block diagram of a power switch is shown. According to the embodiment of FIG. 42, a control circuit 4202 is coupled to a transformer 4204 which receives a source of power such as a reference input voltage (e.g. a voltage applied to the building and received by the timer by way of the input 4206). The control circuit 4202 may be a processor, such as a microprocessor for example. The input voltage may be coupled to the transformer 4204 which generates a reference voltage on an internal voltage line 4207. The voltage generated on the internal voltage line 4207 may comprise a low voltage (e.g. 5 volts for powering circuit elements of the timer 102) which may be coupled to the other elements by the control circuit 4202. A backup battery 4209 is also coupled to the control circuit, and may be charged by the voltage applied to the control circuit and used by the control circuit to power other elements of the timer 102 in the event of a loss of power. The control circuit is also coupled to the input portion 4210, which may correspond to control element 112 and user interface 314, to receive inputs entered by a user, as well as the display 4211 to display the status of the timer as set forth above. The control circuit is also coupled to an oscillator 4212 which enables the control circuit to maintain the time for the timer after a current time is supplied to the timer. The control circuit 4202 accesses a memory 4212 by way of a communication link 4213, which may be a bidirectional data bus.

The timer also comprises a switch 4220 which enables the application of a voltage provided by a voltage line 4222 from the transformer 4204. The voltage on voltage line 4222 is the appropriate voltage for providing power to the outlet or receptacle 4223, which may be the input voltage or a voltage which is greater than or less than the input voltage. The switch is controlled by a control signal 4224. When the switch is closed, the voltage at the voltage line 4222 is provided to a positive electrical terminal, while a negative electrical terminal of the receptacle is coupled to second reference voltage designated as a ground (GND) voltage. According to an alternate embodiment, the switch could be between a negative terminal of the light and a ground node to connect or disconnect the ground potential. In either case, the switch functions to decouple a reference voltage from the device which is being controlled by the power switch, therefore disabling the device. As will be described in more detail below, the control signal on control line 4224 coupled to control the switch 4220 is generated by the control circuit 4202 according to timing characterization data and enables the application of power to the switch on a line 4222. The circuit could also include a wireless transceiver 4230 having an antenna 4232 and communication link 4234 with the control circuit 4202. The wireless transceiver could be any type of device for receiving wireless signals, and more particularly receiving operational information, such as a GPS receiver or a cellular receiver. The timing characterization data, also known as a timing pattern having switching events could be on and off times for applying power to a receptacle of the power switch, as described above. During normal operation, the control circuit may enable the timer to run continuously, and more particularly, in a repeating pattern, either daily or weekly for example, according to the timing characterization data. It should be noted that the elements of the power switch of FIG. 42 could be distributed in different elements of a device, as described above. Further the various elements of the devices described above could be implemented in one or more elements of FIG. 42. For example, the control element 112 could be implemented in one or both of the input portion 4210 and the display 4211. The receiver circuit 108 could be implemented as a part of wireless transceiver 4230.

Figure 43:
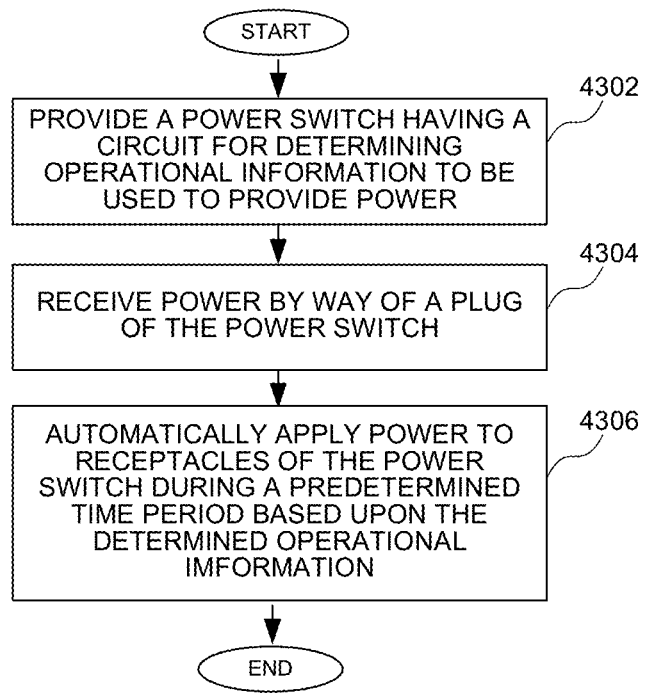
FIG. 43 is a flow chart showing a method of automatically applying power to receptacles of a power switch.

The following are flow charts describing methods for implementing timers. The methods could be implemented using the circuits, systems and user interfaces shown in FIGS. 1-42, or other suitable circuits, systems and user interfaces. Turning now to FIG. 43, a flow chart shows a method of automatically applying power to receptacles of a power switch. A power switch having a circuit for determining operational information to be used to provide power is provided at a block 4302. Power is received by way of a plug of the power switch at a block 4304. Power is automatically applied to receptacles of the power switch during a predetermined time period based upon the operational information at a block 4306. That is, where the date is used for selecting appropriate dusk and dawn times, any date in December could be used to select appropriate dusk and dawn times. It should be noted that, while it is indicated that the operational information is received, not all of the information that is received may be needed. For example, a date may not be needed for devices that are intended to be implemented as holiday decorations, where it would be assumed that the date would be some date in December.

Figure 44:
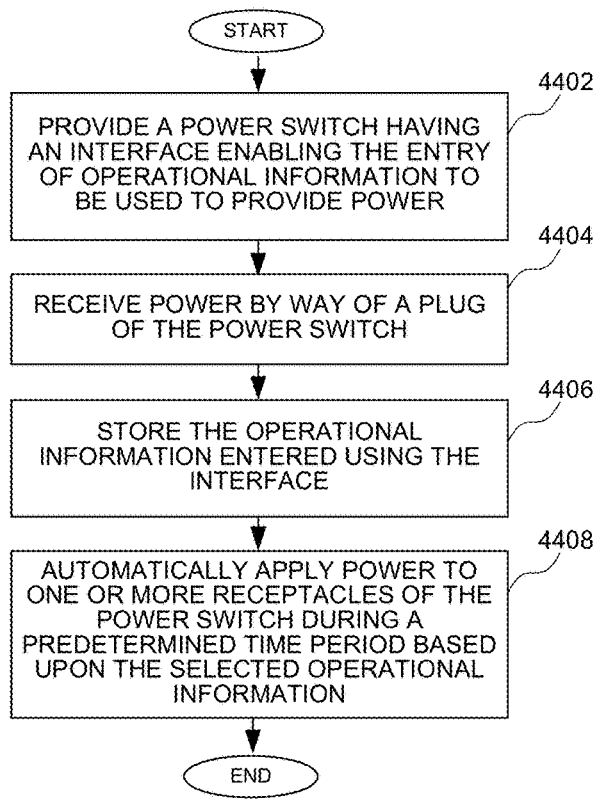
FIG. 44 is a flow chart showing a method of storing operational information such as time, date and location information to automatically apply power to one or more receptacles of a power switch.

Turning now to FIG. 44, a flow chart shows a method of storing operational information to automatically apply power to receptacles of a power switch. A power switch having an interface enabling the entry of operational information to be used to provide power is provided at a block 4402. Power is received by way of a plug of the power switch at a block 4404. Operational information entered using the interface is stored at a block 4406. Power is automatically applied to one or more receptacles of the power switch during a predetermined time period based upon the selected operational information at a block 4408. That is, the user need not program a timing pattern indicating when the power switch should apply power to lights or some other appliance or other electrical device plugged into the receptacle. Rather, the power switch is pre-programmed to turn on and off at predetermined times. The predetermined times could be times that would be commonly used for a particular application, such as for applying power for holiday lighting or outdoor lighting.

Figure 45:
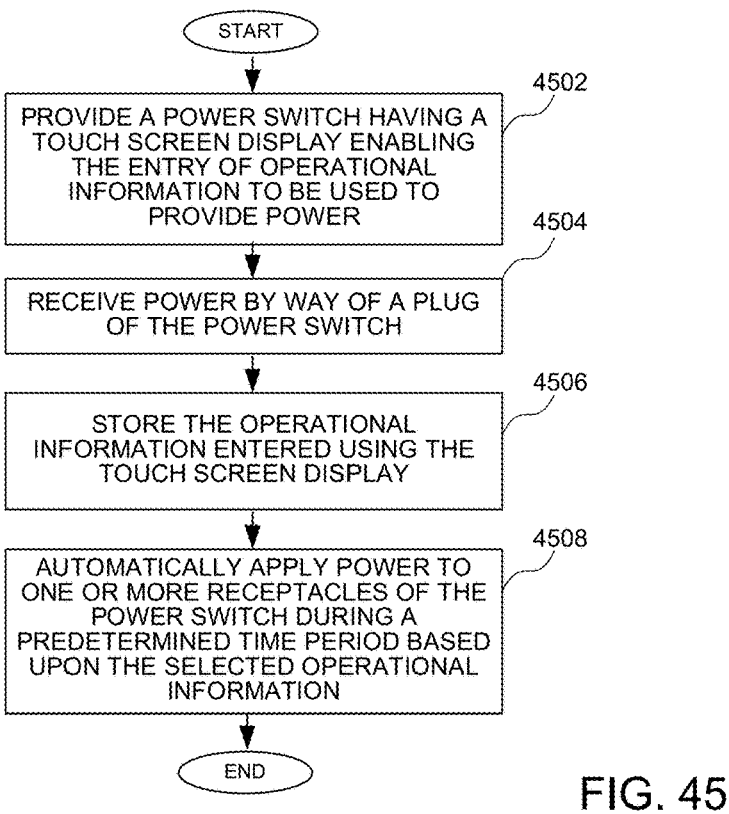
FIG. 45 is a flow chart showing a method of implementing a touch screen display to enable storing operational information such as time, date and location information to automatically apply power to one or more receptacles of the power switch.

Turning now to FIG. 45, a flow chart shows a method of implementing a touch screen display to enable storing operational information to automatically apply power to one or more receptacles of the power switch. A power switch having touch screen display enabling the entry of operational information to be used to provide power is provided at a block 4502. Power is received by way of a plug of the power switch at a block 4504. Operational information entered using the touch screen display is stored at a block 4506. Power is automatically applied to one or more receptacles of the power switch during a predetermined time period based upon the entered operational information at a block 4508. The operational information could be entered using a swiping motion associated with fields, as described for example in FIG. 14-29 or using handwriting recognition as described in FIG. 30-36.

Figure 46:
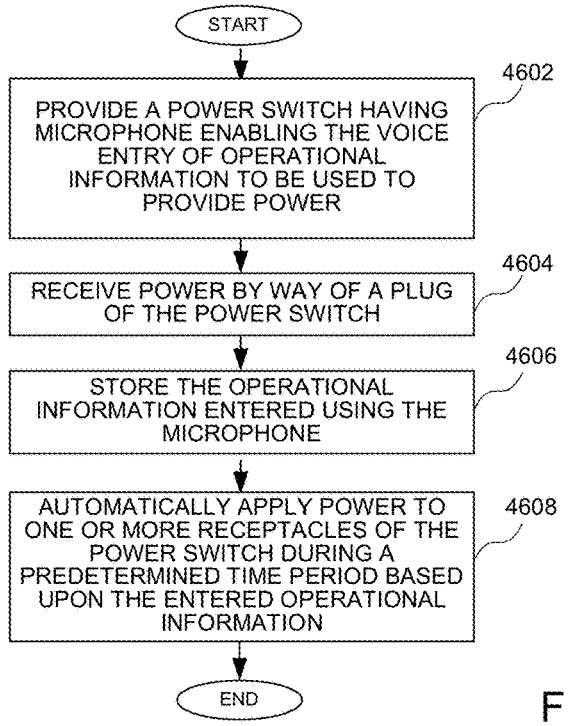
FIG. 46 is a flow chart showing a method of using voice recognition to store operational information such as time, date and location information to enable automatically applying power to one or more receptacles of a power switch.

Turning now to FIG. 46, a flow chart shows a method of using voice recognition to store operational information to enable automatically applying power to one or more receptacles of a power switch. A power switch having a microphone enabling the voice entry of perational information to be used to provide power is provided at a block 4602. Power is received by way of a plug of the power switch at a block 4604. Operational information entered using the microphone is stored at a block 4606. Power is automatically applied to one or more receptacles of the power switch during a predetermined time period based upon the entered operational information at a block 4608.

Turning now to 47, a flow chart shows another method of using voice recognition to store operational information to enable applying power to one or more receptacles of a power switch, and more particularly, providing operational information in response to a voice prompt from the power switch. A power switch having a microphone enabling the voice entry of operational information to be used to provide power is provided at a block 4702. Power is received by way of a plug of the power switch at a block 4704. It is then determined whether the user desires to enter operational information at a block 4706. A prompt is optionally provided by a speaker and operational information is received by way of the microphone at a block 4708. For example, a power switch could determine that no operational information is stored when the power switch is plugged in, and automatically prompt a user to enter time information by stating the current time, for example, followed by a prompt for a date and a prompt for a location for example. Alternatively, the prompts from the power switch could be provided as shown and described in reference to FIGS. 12 and 13. Operational information entered using the microphone is stored at a block 4710. Power is automatically applied to one or more receptacles of the power switch during a predetermined time period based upon the entered operational information at a block 4712.

Figure 48:
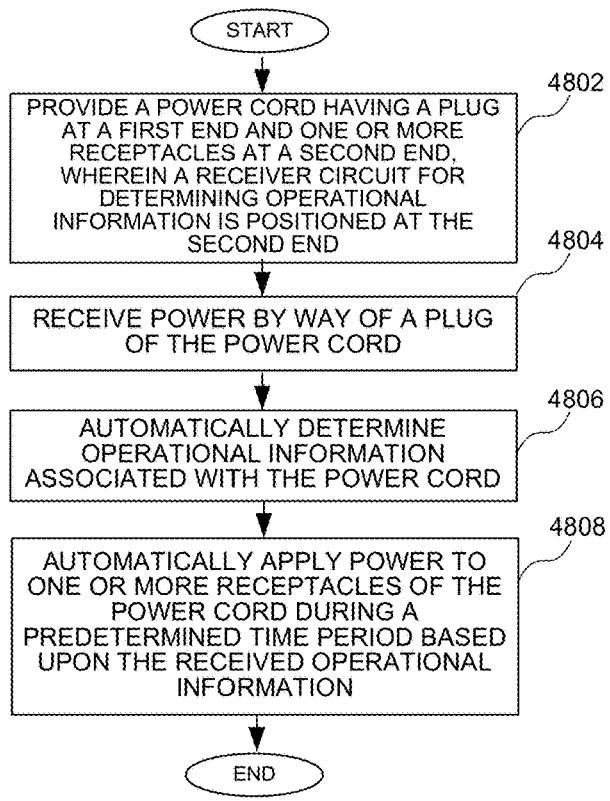
FIG. 48 is a flow chart showing a method of positioning a receiver circuit at an end of a string of lights to enable receiving operational information.
Figure 49:
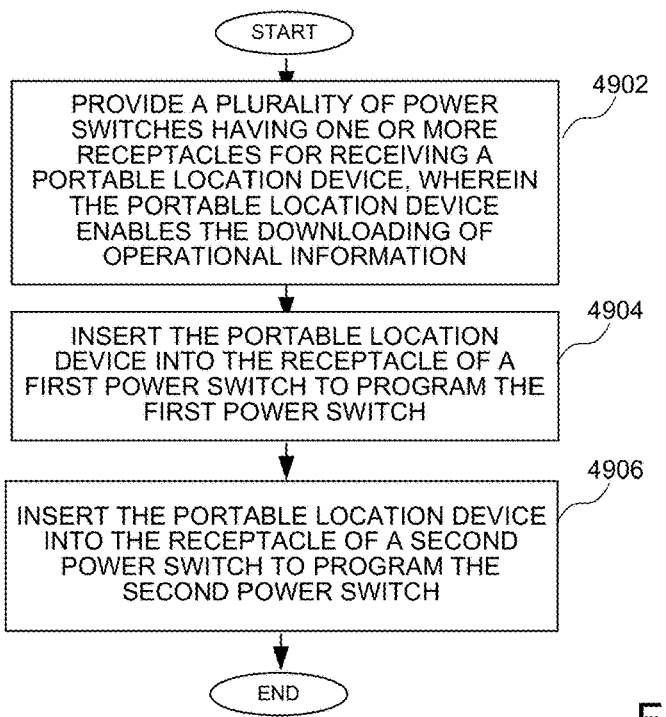
FIG. 49 is a flow chart showing a method of using a portable location device to program a plurality of power switches.

Turning now to FIG. 48, a flow chart shows a method of positioning a receiver circuit at an end of a string of lights to enable receiving operational information. A power cord having a plug at a first end and one or more receptacles at a second end is provided at a block 4802, wherein a receiver circuit is positioned at the second end. Power is received by way of a plug of the power cord at a block 4804. Operational information associated with the power cord is automatically determined at a block 4806. Power is automatically applied to one or more receptacles of the power cord during a predetermined time period based upon the received operational information at a block 4808. By positioning the receiver circuit away from the power switch, which would be plugged into an outlet, the receiver circuit would have a greater chance of acquiring operational information, such as in a case where the outlet is in a covered area, such as a covered porch. By way of example, the receiver circuit could be a GPS receiver or a cellular receiver as described for example in reference to FIGS. 40 and 41.

Turning now to 49, a flow chart shows a method of using a portable location device to program a plurality of power switches. A plurality of power switches having one or more receptacles for receiving a portable location device is provided at a block 4902, wherein the portable location device enables the downloading of operational information. The portable location device is inserted into one of the receptacles of a first power switch to program the first power switch at a block 4904. The portable location device is inserted into the receptacle of a second power switch to program the second power switch at a block 4906. Using a single portable location device provides a cost-efficient way of implementing power switches that use operational information. However, it should be noted that the portable location device could provide other information to a power switch, such as timing patterns for example.

Figure 50:
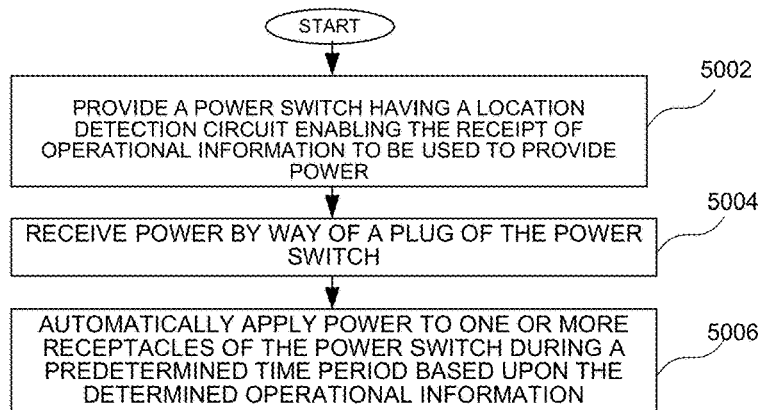
FIG. 50 is a flow chart showing a method of implementing a power switch having a location detection circuit enabling the receipt of time, date and location information.

Turning now to FIG. 50, a flow chart shows a method of implementing a power switch having a location detection circuit enabling the receipt of time, data and location information. A power switch having a location detection circuit enabling the receipt of a location to be used to provide power is provided at a block 5002. Power is received by way of a plug of the power switch at a block 5004. Power is automatically applied to the one or more receptacles of the power switch during a predetermined time period based upon the determined location at a block 5006. The location detection circuit could be any type of circuit for receiving location information, as described above. For example, a GPS circuit or cellular circuit could be provided, as described above. In a power switch that may be used only at certain times of the year, such as during a holiday season, it may not be necessary to know the date because the power switch would only be used in a certain date range, such as December through January for example. Accordingly, date information may not always be necessary, and may not always be used.

Figure 51:
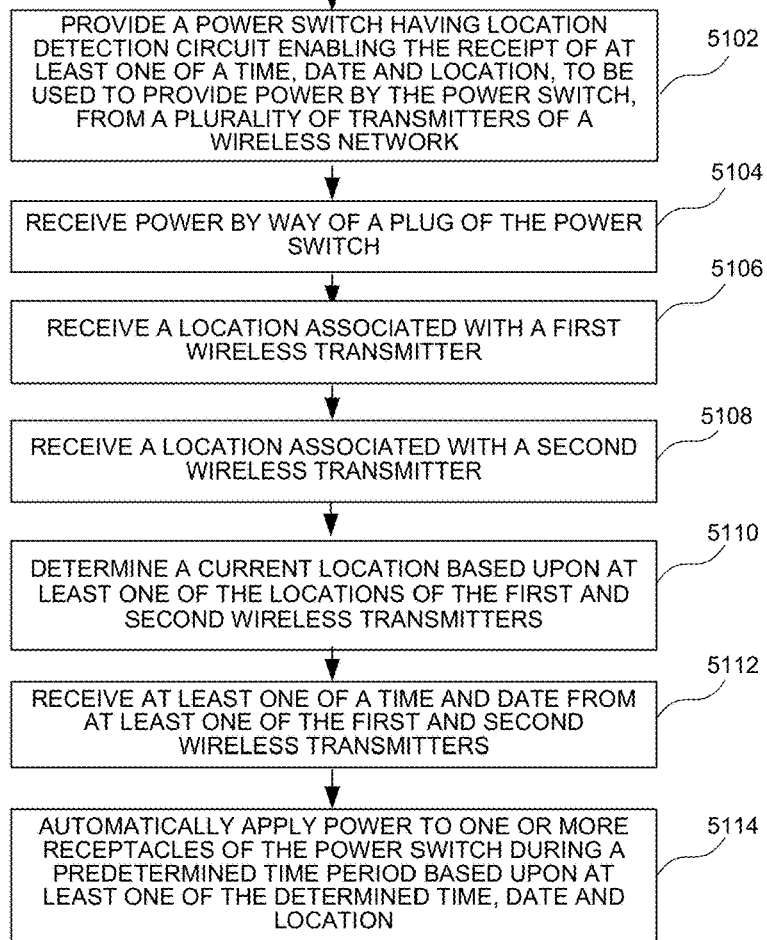
FIG. 51 is a flow chart showing a method of receiving one of a time, date and location from a wireless communication network.

Turning now to FIG. 51, a flow chart shows a method of receiving location information from a wireless communication network. A power switch having location detection circuit enabling the receipt of at least one of a time, date and location, to be used to provide power by the power switch, from a plurality of transmitters of a wireless network is provided at a block 5102. Power is received by way of a plug of the power switch at a block 5104. A location associated with a first wireless transmitter is received at a block 5106. A location associated with a second wireless transmitter is received at a block 5108. A current location is determined based upon the location of at least one of the first and second wireless transmitters at a block 5110. At least one of a time and a date is received from at least one of the first and second wireless transmitters at a block 5112. Power is automatically applied to one or more receptacles of the power switch during a predetermined time period based upon the determined time and location at a block 5114.

Figure 52:
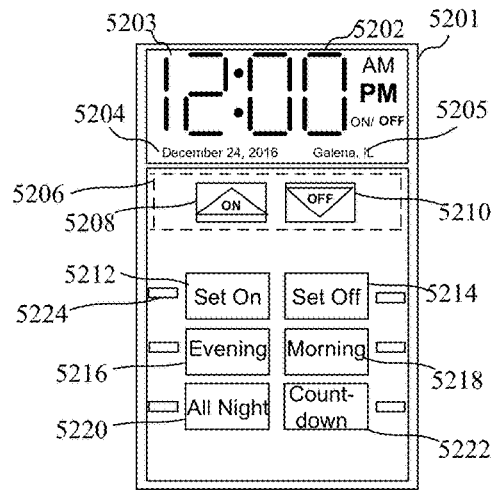
FIG. 52 is a diagram of a timer having a user interface for programming operational information and timing patterns.

Turning now to FIG. 52, a diagram of a timer having a user interface for programming operational information and timing patterns is shown. More particularly, a timer 5201 comprises a user interface having a display 5202 including various programmable fields, including a time field 5203, a date field 5204 and a location field 5205. The time field 5203 may comprise other information such as an AM or PM designation and an ON or OFF designation. As will be described in more detail below, various fields of the display may be programmed using various programming options as set forth above (e.g. using the touch screen display of FIGS. 14-36 or the voice recognition features of FIGS. 12-13), and will be described by way of example in FIGS. 53-56. The timer also comprises a control portion 5206, shown here having a scroll up button 5208, which also functions as an on button when not in a programming mode, and a scroll down button 5210, which also functions as an off button when not in a programming mode. While the various programming steps could be accomplished by using touch screen features or voice recognition features as will be described in more detail below, the scroll up button and the scroll down button could also be used to enable the selection of information for any of the programmable fields of the user interface. It should be understood that the up and down scrolling buttons could be implemented as touch screen elements on the display.

The timer of FIG. 52 also comprises programmable and pre-programmed buttons. More particularly, programmable buttons 5212 and 5214 enable on and off times respectively. For example, when the "set on" button 5212 is pressed and held for a predetermined period of time, a user could use the scroll up and scroll down button to select an on time for a timing pattern of the timer. The on time could include a dusk or dawn setting, where dusk or dawn settings could be selected when cursing through available times for on or off, such as a setting for dawn could be available for selection right after 6:00 AM option and a setting for dusk could be available for selection right after a 6:00 PM option. The "set off" button 5214 could be set in a similar manner. Pre-programmed buttons could also be implemented. For example, a pre-programmed evening button 5216 could turn on the lights during evening hours (such as between a pre-programmed time of 6:00 PM to 11:00 PM), a pre-programmed morning button 5218 could turn on the lights during morning hours (such as between a pre-programmed time of 5:00 AM to 8:00 AM), and a pre-programmed "All Night" button 5220 could turn on the lights during night hours (such as between a preprogrammed time of 6:00 PM to 8:00 AM). A countdown timer could also be implemented. A selection indicator 5224, such as an LED light, could be implemented next to the programmable or pre-programmed button. While fixed on times or off times, such as 11:00 PM or 8:00 AM, are described, it should be understood that the pre-programmed buttons could be programmed to have dusk or dawn as on or off times.

Figure 53:
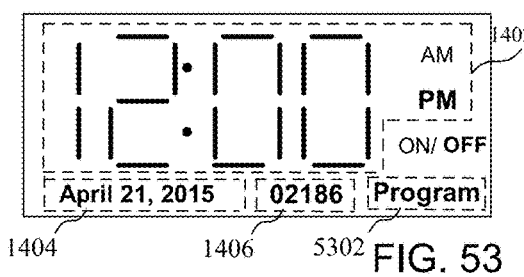
FIG. 53 is a view of a display showing a main screen for enabling programming operational information and timing patterns.

Turning now to FIG. 53, a view of a display showing a main screen for enabling programming operational information and timing patterns is shown. In addition to the information fields shown in FIG. 14, a programming field (Program) may also be implemented, as shown in FIG. 53. When the programming field 5302 is selected, such as by pressing the programming field portion of the touch screen display or using a voice recognition feature, a number of setting fields 5402 are provided. A particular setting field could be selected to program a timing pattern, as will be described in reference to FIGS. 55 and 56, or a Done field 5404 could be selected to return to the main display as shown in FIG. 53. It should be noted that a setting (e.g. setting 1 through setting 6 as shown) or the done field could be selected using a touch screen function on the display or using voice recognition.

Turning now to 55, a view of a display provided in response to the selection of a settings option is shown. After a particular setting is selected, an ON TIME field is displayed, as shown in field 5502. The time for implementing an on time for a timing pattern could be selected using a touch screen feature as described above in reference to FIG. 15, or by voice recognition. According to the implementation of FIGS. 55 and 56, the hours and minutes portions of the time could be changed separately by swiping over either the hour portion or the minute portion of the touch screen. Dusk and dawn could also be selected as on time or an off time. For example, dusk could appear between 6:00 PM and 7:00 PM when scrolling to enter the hour and dawn could appear between 6:00 AM and 7:00 AM when scrolling through the hour. Alternatively, the hours and minute fields could change together while a user swipes the screen up or down. For example, the time may change from 11:47 AM to 12:19 PM with a single swipe.

Figure 54:
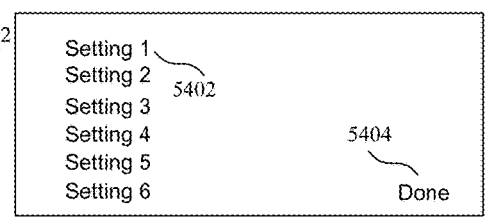
FIG. 54 is a view of the display shown in response to the selection of the programming option.
Figure 55:
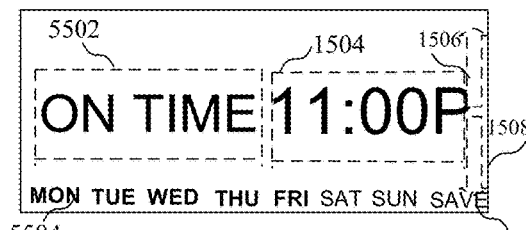
FIG. 55 is a view of a display shown in response to the selection of a settings option for an on time.
Figure 56:
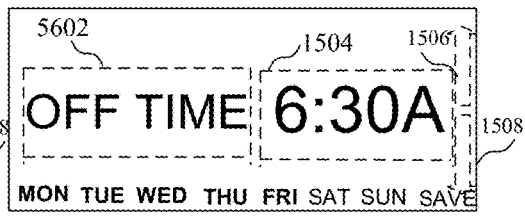
FIG. 56 is a view of a display shown in response to the saving of an on time.

The days of the week for applying the setting could be selected by a touch screen feature or voice recognition, where the selected days would be shown in bold. While individual days are shown by way of example, it should be understood that groups of days could be provided, such as weekdays or weekends for example. When the save option 5506 is selected, the user interface will advance to the screen as shown in FIG. 56, which enables the selection of an off time. The same days of the week will be selected to create an on/off pair for the selected on and off times in the displays of FIG. 55 and FIG. 56. As shown in FIGS. 55 and 56, the on and off times for the first setting (i.e. setting 1) are 11:00 PM and 6:30 AM respectively for the weekdays of Monday through Friday. When the save option is selected, the user interface will return to the display as shown in FIG. 54, which will enable the user to select another setting or to select done to return to the main screen as shown in FIG. 53. While the user interface elements of FIGS. 53-56 are described in reference to the timer 5201 of FIG. 52 having programmable and preset buttons, it should be understood that the various user interfaces set forth above could be implemented with any type of timer.

Turning now to FIGS. 57 and 58, a map showing latitude and longitude lines which could be used to divide a geographical region, shown here by way of example as the United States. It should be noted that the latitude and longitude lines are shown by way of example, and are not intended to necessarily show accurate latitude and longitude lines. Also, while 24 regions of the lower 48 states of the United States are created by latitude and longitude lines as shown, it should be understood that any number of regions could be created by greater or fewer latitude and longitude lines. The selected longitudinal and latitudinal lines need not be separated by the same number of degrees (e.g. 5 degrees) as shown in FIG. 57, but may be separated by different numbers of degrees. Also, the lines need not be continuous on the same horizontal or vertical. For example, the three vertical lines within the boundary of the lower 48 states could correspond to the time zone lines that create the 4 time zone regions, Pacific, Mountain, Central and Eastern. It should be noted that certain geographical regions within the United States apply different rules related to the changing of times during daylight savings and standard time. As a result, separate tables providing dusk and dawn data may be used for daylight savings time and standard time. It should be noted that the dusk and dawn data could be updated over time to account for changes in daylight savings time rules by reprogramming a control device or a remote switching device. The devices could be reprogrammed by downloading new data by way of a data port, such as a USB port as described above, or via cellular communication to a cellular receiver on the control device or a remote switching device.

As shown in FIG. 58, a table having combinations of latitude and longitude ranges is provided to enable a power switch to access an appropriate table having dusk and dawn times to be applied with implementing a timing pattern as described above. For a power switch having a GPS receiver or some other receiver that is capable of receiving location information, such as latitude and longitude values associated with the location of the power switch, the received latitude or longitude values are used to determine a region in which the power switch is located, and therefore enable selecting a table associated with the region for applying appropriate dusk and dawn times. An example of a table associated with a region will be described in more detail in reference to FIG. 59. While a reference to a table is provided by way of example, it should be understood that a reference to equations or other algorithms for calculating dusk and dawn times could be provided. That is, based upon time and date, a dawn and dusk time could be calculated for a given region.

As shown in FIG. 59, an example of a table having a plurality of date ranges and corresponding dusk and dawn times that would be applied for a timing pattern implemented by a power switch, such as any of the power switches described above, is shown. FIG. 59 shows an example of one table, where a separate table would be implemented for each region and would have dusk (DUSK1-DUSKN) and dawn (DAWN1-DAWNN) times associated with date ranges for that region. The dusk and dawn times could be based upon averages for the region, or could be weighted to be optimized for the most populous area of the region.

According to the example regions of FIG. 57, 24 tables would be available to be accessed by a device, such as a control device or a remote switching device, in any one of the 24 regions, where a power switch in region A2 would access Table A2 to implement dusk and dawn times in a timing pattern. According to the example table of FIG. 59, a plurality of date ranges extending from 1 to N, where N can be any number up to 365. That is, N could be selected to provide a date range for a predetermined number of days. For example, N could be 12, where dusk and dawn times would change 12 times during the year, such as on the first of every month. N could be selected to be 52, where dusk and dawn times would change 52 times a year, such as every Sunday. N could even be selected to be 365, where the dusk and dawn times would change every day. For the N date ranges, the number of dates of each date range need not have the same number of days. For example, there may be some periods of time of the year during which the dusk and dawn times change less rapidly. During those times, the date range could be longer. In contrast, at certain times such as during fall and spring, the dusk and dawn times may change at a greater rate each day or week. During these times, it may be beneficial to have fewer days associated with a date range.

Figure 60:
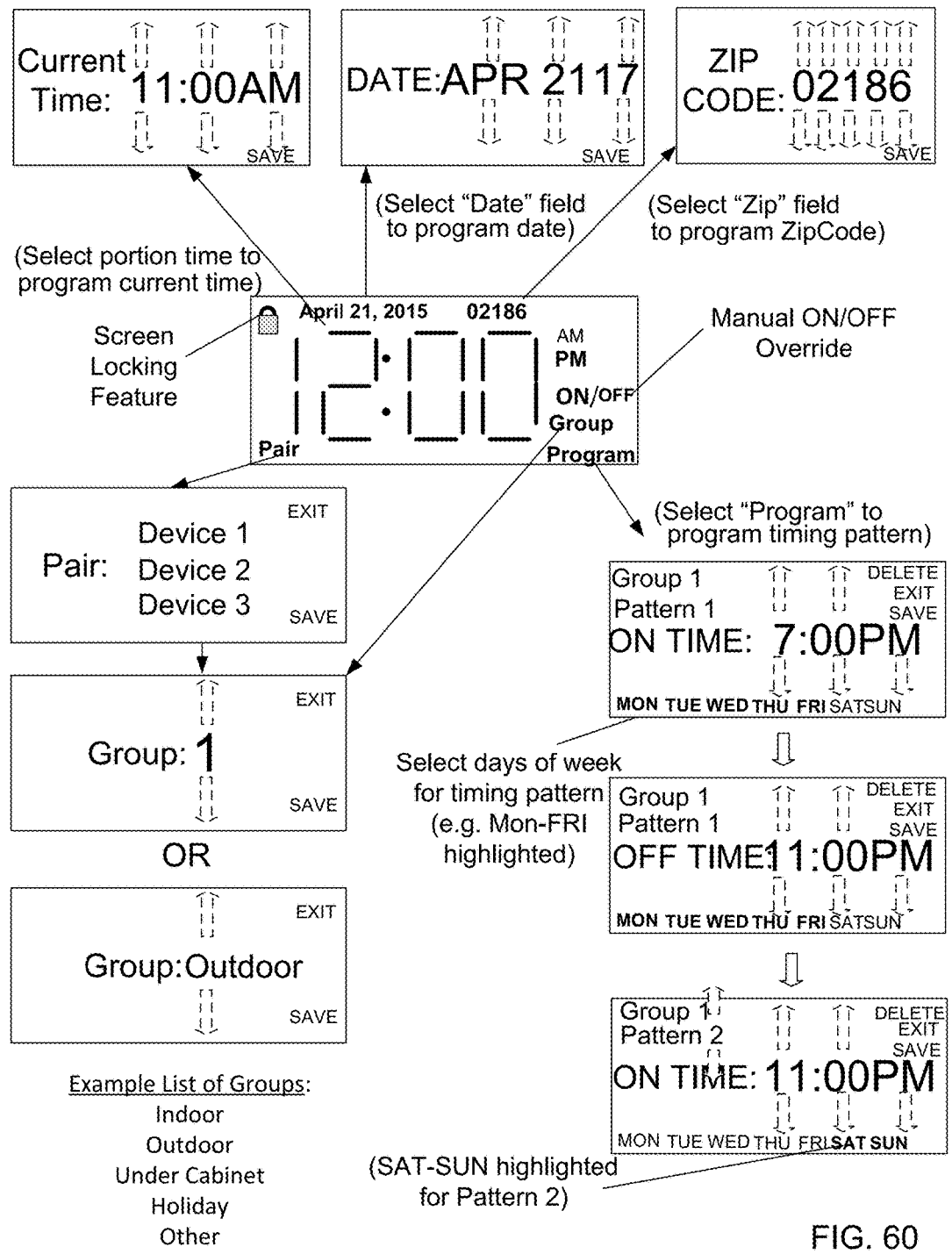
FIG. 60 is another touch screen user interface having a plurality of user selectable fields that could be changed by a swiping action associated with the field.
Figure 61:
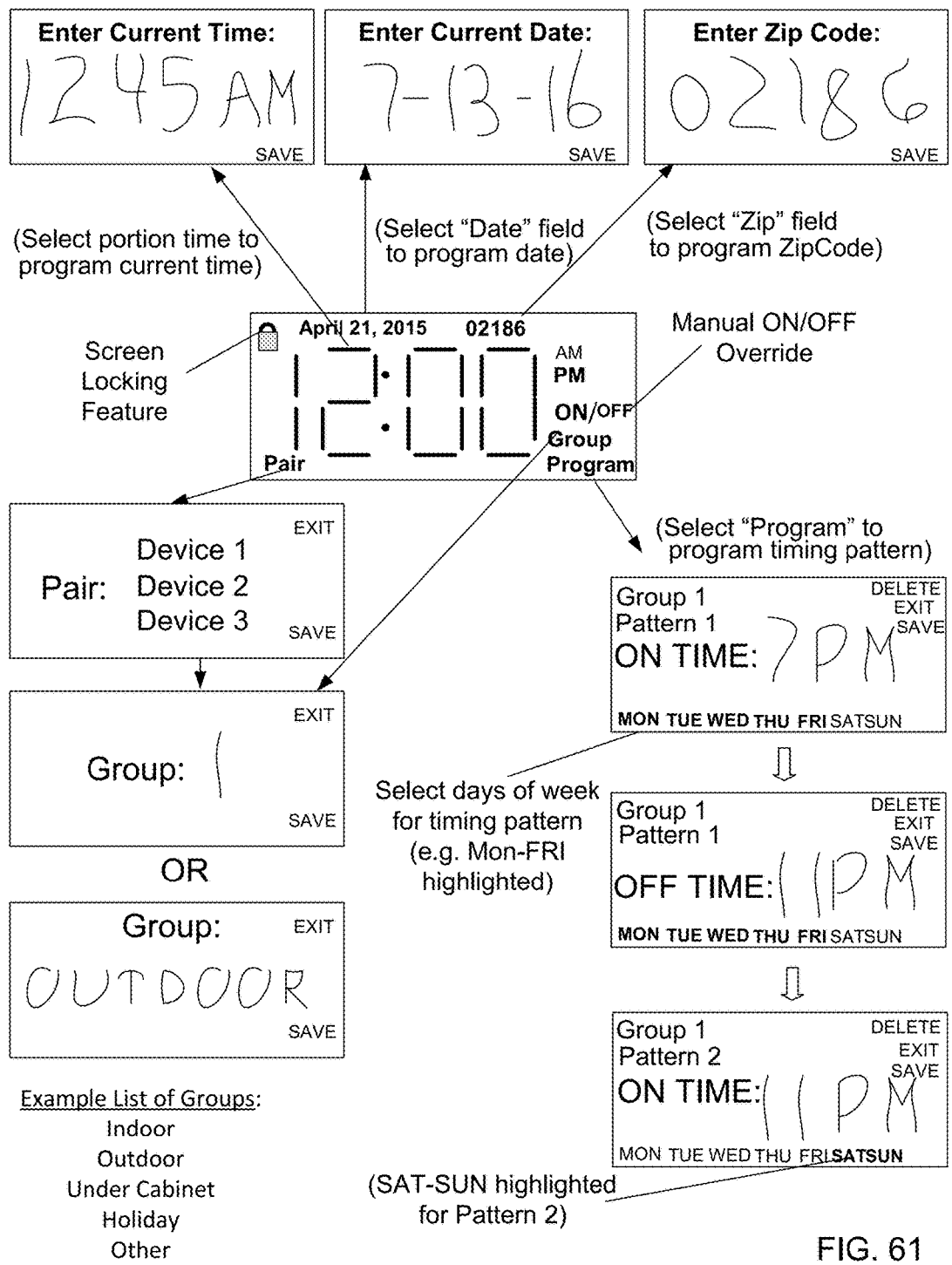
FIG. 61 is another touch screen user interface having a plurality of user selectable fields that could be changed using hand writing recognition.

Turning now to FIGS. 60 and 61, additional touch screen interfaces are described that enable the programming or other control of a device, such as a power switch as described above for example. According to the implementation of FIG. 60, various fields can be selected to enable a programming operation for that field. Other fields are used for direct control devices, such as a manual on/off override field, where on or off could be selected by touching that location of the screen to change the state of a device controlled by the power switch. The display could include a screen locking feature to prevent inadvertent changing of the data on the display. For example, the user could be required to press and hold the locking feature to unlock the screen to enable changing the screen.

According to one implementation where time, date and location are not provided to or received by the power switch, time, date and location can be easily entered by selecting the appropriate portion of the display (e.g. tapping that portion of the display with a finger or stylus). To enter or change a current time, the time portion (shown here as 12:00) is selected, causing the display to show the current time, which can be changed from 12:00 PM to 11:00 AM as shown by swiping a field (shown here as an hour field (11), a minute field (00), and an AM/PM field (AM)). The changes can be saved by selecting the SAVE option or in response to a time-out. Similarly, the date can be changed by selecting the date field on the display (shown here as Apr. 21, 2017), where the month (APR), date (21) and year (17) can be changed by an up or down swiping action. A location could also be entered or changed. After selecting the location field (02186), the Zip Code could be displayed, where each digit of the Zip Code could be changed by a swiping action and saved by the selection of the save option. While a Zip Code is shown by way of example for providing a location, it should be understood that any other location information could be used, such as Latitude and Longitude values, an area code, or some other location designation.

Pairing, grouping, and programming can also be easily performed using the touch screen interface of FIG. 60. As shown in FIG. 60, a pairing option provided in the lower left portion of the display could be selected to enable the pairing of a remote switching device that is detected by a control device. For example, by selecting one of the detected devices (i.e. touching the name of the detected device), the selected device would then be paired. After pairing, it could be possible to assign the paired remote switching device with a group. A group, such as a numeric group, could be selected by swiping the number field up or down. Alternatively, a descriptive name designation, such as indoor, outdoor, under cabinet, holiday or other, could be selected.

The grouping of devices can also be changed after groups are established. For example, the grouping option could be selected to display the different groups, where a particular group can be selected to change the devices within the group. That is, after selecting a group, a specific device within the group could then be selected, where the group for the selected device could be shown and changed.

While pairing and grouping are shown as separate operations by way of example, the pairing and grouping options could be performed together. For example, rather than pairing or grouping, a device option could be presented. After selecting the device option, a list of remote switching devices detected by the control device could be displayed. The devices that are not paired could be designated as unpaired, and could be selected to be paired. A remote switching device that is paired could have a group designation, or an indication that the device is not in a group. A group could be added for a device that is not assigned to a group, or an assigned group could be changed.

The grouping of devices can also be changed after groups are established. For example, the grouping option could be selected to display the different groups, where a particular group can be selected to change the devices within the group. That is, after selecting a group, a specific device within the group could then be selected, where the group for the selected device could be shown and changed.

While pairing and grouping are shown as separate operations by way of example, the pairing and grouping options could be performed together. For example, rather than pairing or grouping, a device option could be presented. After selecting the device option, a list of remote switching devices detected by the control device could be displayed. The devices that are not paired could be designated as unpaired, and could be selected to be paired. A remote switching device that is paired could have a group designation, or an indication that the device is not in a group. A group could be added for a device that is not assigned to a group, or an assigned group could be changed.

Programming can also be implemented by selecting the program option. As shown in FIG. 60, a first pattern, designated as "Pattern 1" is displayed with a user selecting an on time after the program option is selected. That is, the user can swipe hour, minute and an AM/PM designations to enable the selection of the on time for Pattern 1. A user can also select particular days for applying Pattern 1. After saving the on time and desired days for Pattern 1 by selecting the save option, the display will then show an off time field to enable selecting an off time for Pattern 1. After saving the off time, the display will then advance to the next timing pattern. It could also be possible to exit the programming mode by selecting the exit option, or delete a particular timing pattern by selecting the delete option. While the implementation of FIG. 60 relates to a swiping operation associated with fields of a touch screen display, it should be understood that other data input techniques could be implemented for the various field shown in FIG. 60, such as handwriting recognition as shown in FIG. 61 or voice recognition.

Figure 62:
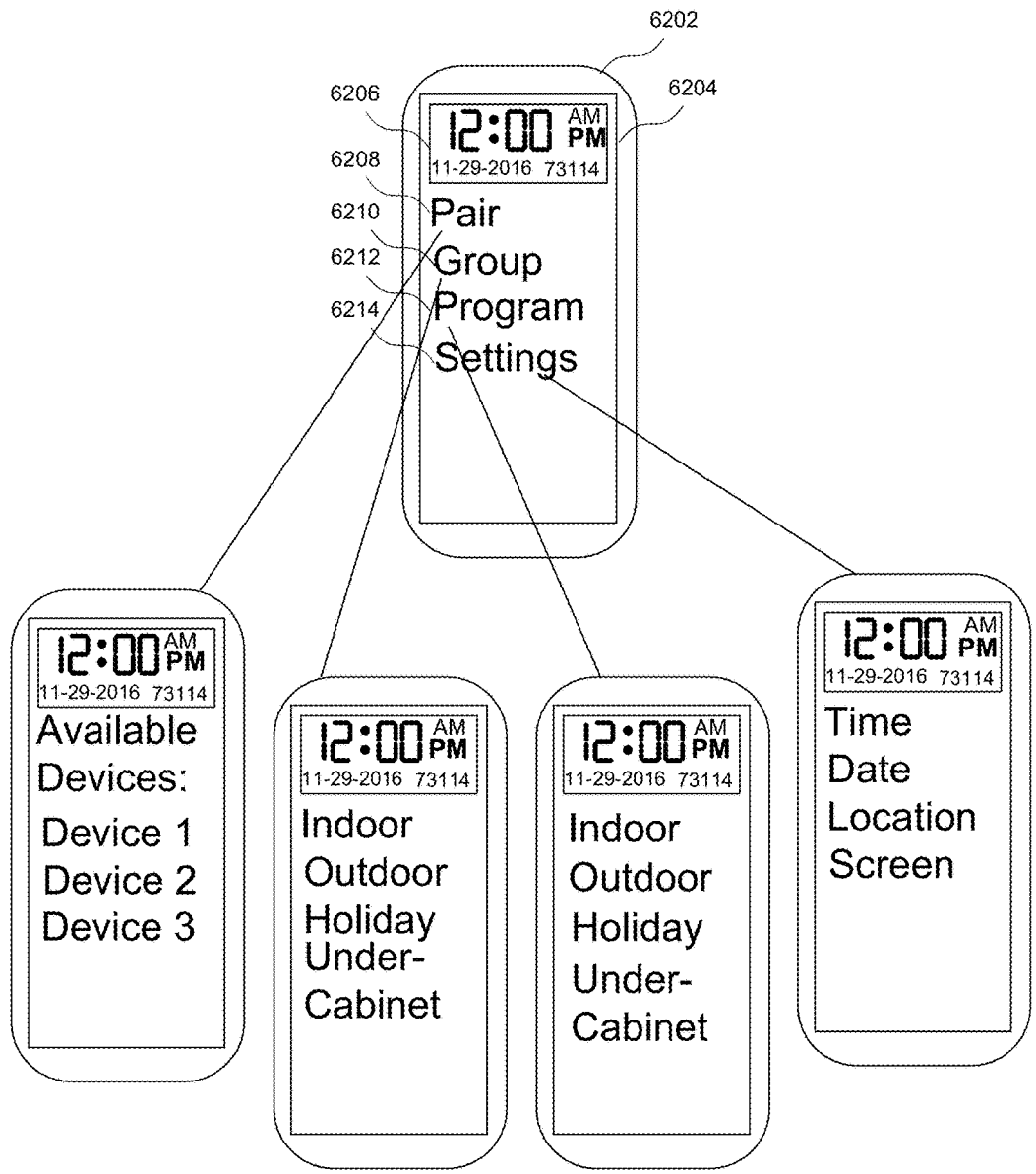
FIG. 62 is a menu-based touch screen user interface.

FIG. 62 is directed to a user interface having a touch screen covering a substantial portion of a surface of the portable control device for controlling one or more power switches. The portable control device 6202 could be implemented in any portable electronic device, such as a mobile phone device or a tablet computer for example, or could be a dedicated control device for controlling power switches, such as any of the power switches described above. The portable control device 6202 could comprise a status portion 6206 showing information associated with the control device, such as time, date and location information associated with the control device, or other information related to the programming of one or more power switches controlled by the control device. Various programming functions may be provided below the status portion 6206, shown here by way of example as a PAIR function 6208, a GROUP function 6210, a PROGRAM function 6212, and a SETTINGS function 6214, where examples associated with each of the functions is shown below the portable control device.

According to one example of the PAIR function 6208, available devices with which the portable control device could pair are provided. The devices could be listed according to a number, shown here as Device 1, Device 2, and Device 3, and could be renamed after the portable control device is paired with a listed available device.

According to one example of a GROUP function 6210, different groups (i.e. specific devices which are commonly controlled by the portable control device) are displayed. The GROUP function would allow a user to select a group to see the devices that are currently included in the selected group, and change devices in that group. For example, a particular device of the group could be selected to display information related to the device. The user could then select a group option in the displayed information, allowing the user to change the group.

According to one example of a PROGRAM function 6212, the list of groups could also be provided, where the user could then select a group to enter programming information, such as one or more timing patterns, where the timing pattern would be applied to each device in the group.

The programming could be performed according to the touch screen interface implementation as described above in reference to FIG. 60, or using some other suitable programming interface.

According to one example of a SETTINGS function 6214, a user could select any of settings field, such as time, date or location to change an information setting of the control device. Alternatively, a user could select a screen option to change other features of the portable control device, such as screen brightness, font size, or any other feature of the portable control device. While the menu-based user interface is shown by way of example as advancing from one screen to another screen in response to the selection of an item on a screen, the menu-based user interface could implement a pull-down menu interface for example, or some other suitable menu-based user interface.

It can therefore be appreciated that the new and novel power switch and methods of implementing a power switch have been described. It will be appreciated by those skilled in the art that numerous alternatives and equivalents will be seen to exist which incorporate the disclosed invention. While various features are disclosed in different embodiments, it should be understood that features in a particular embodiment could be implemented in another embodiment. That is, various features can be interchanged in different implementations to provide improved programming of power switches and particularly the implementations of a power switch. That is, different features that may be implemented in various implementations can be included in a single implementation. As a result, the invention is not to be limited by the foregoing implementations, but only by the following claims.

We claim:

1. A multi-element lighting apparatus comprising:
   a receiver circuit for receiving a time for use by the multi-element lighting apparatus;
   a power switch having a plurality of prongs for receiving power;
   a power cord coupled to the power switch;
   a plurality of lighting elements coupled to the power cord, wherein the power cord distributes the power received by the power switch; and
   a control circuit configured to control the power switch;
   wherein the control circuit controls an application of the power to the power cord based upon the time received by the receiver circuit.

2. The multi-element lighting apparatus of claim 1 wherein the control circuit controls the application of the power to the power cord to turn on and turn off the plurality of lighting elements at predetermined times.

3. The multi-element lighting apparatus of claim 1 further comprising a control element for selecting an on time for turning on the plurality of lighting elements and an off time for turning off the plurality of lighting elements during the operation of the power switch.

4. The multi-element lighting apparatus of claim 1 further comprising a control element having an actuator to turn on the plurality of lighting elements and to turn off the plurality of lighting elements.

5. The multi-element lighting apparatus of claim 1 further comprising a terminal end portion having an outlet.

6. The multi-element lighting apparatus of claim 1 wherein the receiver circuit is associated with a terminal end portion.

7. The multi-element lighting apparatus of claim 1 wherein the receiver circuit comprises a GPS circuit.

8. A multi-element lighting apparatus comprising:
   a power switch having a plurality of prongs for receiving power;
   a power cord coupled to the power switch;
   a terminal end of the power cord having a receiver for receiving a time for use by the multi-element lighting apparatus;
   a plurality of lighting elements coupled to the power cord, wherein the power cord distributes the power received by the power switch; and
   a control circuit configured to control the power switch;
   wherein the control circuit controls an application of the power to the power cord based upon the time received by the receiver circuit.

9. The multi-element lighting apparatus of claim 8 wherein the terminal end of the power switch further comprises a receptacle for receiving a plug.

10. The multi-element lighting apparatus of claim 8 further comprising a control element for selecting an on time for turning on the plurality of lighting elements and an off time for turning off the plurality of lighting elements during the operation of the power switch.

11. The multi-element lighting apparatus of claim 8 further comprising a control element having an actuator to turn on the plurality of lighting elements and to turn off the plurality of lighting elements.

12. The multi-element lighting apparatus of claim 8 wherein the control circuit controls the application of the power based upon at least one of a sunrise or a sunset for a location associated with the multi-element lighting apparatus.

13. The multi-element lighting apparatus of claim 8 wherein the receiver circuit comprises a GPS circuit.

14. A method of implementing a multi-element lighting apparatus, the method comprising:
   receiving power at a power switch;
   coupling the power switch to a power cord;
   implementing, by a control circuit, a plurality of lighting elements coupled to the power cord, wherein the power cord distributes the power received by the power switch; and
   receiving, by a receiver, a time for use by the multi-element lighting apparatus;
   wherein the control circuit controls an application of the power to the power cord based upon the time received by the multi-element lighting apparatus.

15. The method of claim 14, wherein the multi-element lighting apparatus further comprises an outlet for receiving a plug.

16. The method of claim 14, wherein the method further comprises selecting an on time for turning on the plurality of lighting elements and an off time for turning off the plurality of lighting elements during the operation of the power switch.

17. The method of claim 14, further comprising a control element comprising an actuator to turn on the plurality of lighting elements and to turn off the plurality of lighting elements.

18. The method of claim 14, wherein the multi-element lighting apparatus further comprises a terminal end portion having a receptacle.

19. The method of claim 14, wherein the receiver circuit is associated with a terminal end portion.

20. The method of claim 14, wherein the receiver circuit comprises a GPS circuit.

* * * * *